US009143331B2

United States Patent
Avanzi et al.

(10) Patent No.: US 9,143,331 B2
(45) Date of Patent: Sep. 22, 2015

(54) METHODS AND DEVICES FOR AUTHENTICATION AND KEY EXCHANGE

(71) Applicant: QUALCOMM Incorporated, San Diego, CA (US)

(72) Inventors: Roberto Avanzi, Munich (DE); Boris Dolgunov, Ramat-Gan (IL)

(73) Assignee: QUALCOMM Incorporated, San Diego, CA (US)

( * ) Notice: Subject to any disclaimer, the term of this patent is extended or adjusted under 35 U.S.C. 154(b) by 101 days.

(21) Appl. No.: 13/912,045

(22) Filed: Jun. 6, 2013

(65) Prior Publication Data

US 2014/0223182 A1  Aug. 7, 2014

Related U.S. Application Data

(60) Provisional application No. 61/762,198, filed on Feb. 7, 2013.

(51) Int. Cl.
*H04L 9/08* (2006.01)
*H04L 9/32* (2006.01)
*H04L 29/06* (2006.01)

(52) U.S. Cl.
CPC ............ *H04L 9/3271* (2013.01); *H04L 9/0838* (2013.01); *H04L 9/0861* (2013.01); *H04L 9/3273* (2013.01); *H04L 63/061* (2013.01); *H04L 63/0869* (2013.01)

(58) Field of Classification Search
CPC . H04L 9/3271; H04L 9/3273; H04L 63/0869; H04L 9/0861; H04L 9/0838; H04L 63/061; G06F 21/30; G06F 21/44
USPC .................................................. 713/171, 168
See application file for complete search history.

(56) References Cited

U.S. PATENT DOCUMENTS 7,181,196 B2   2/2007  Patel
7,269,741 B2   9/2007  Matsui et al.
(Continued)

FOREIGN PATENT DOCUMENTS

| EP | 1478204 A2 | 11/2004 | |
|---|---|---|---|
| WO | WO-2008045773 A2 | 4/2008 | |
| WO | WO 2008045773 A2 * | 4/2008 | ................ H04L 9/32 |

OTHER PUBLICATIONS (NPL Snapshot).*
(Continued)

*Primary Examiner* — Matthew Smithers
(74) *Attorney, Agent, or Firm* — Loza & Loza, LLP

(57) ABSTRACT

One feature pertains to a content accessing device for securing content. The content accessing device is provisioned with a cryptographic algorithm, and generates a symmetric key also known to a content storage device. The content accessing device sends a first authentication challenge to the content storage device, where the first authentication challenge is based on the cryptographic algorithm and the symmetric key. The content accessing device receives a second authentication challenge from the content storage device in response to sending the first authentication challenge, and determines whether the first authentication challenge is different from the second authentication challenge. If the second authentication challenge is different from the first authentication challenge the content accessing device sends a first response to the content storage device in response to the second authentication challenge.

40 Claims, 16 Drawing Sheets

(56) References Cited

U.S. PATENT DOCUMENTS

| | | | |
|---|---|---|---|
| 8,205,083 | B2 | 6/2012 | Suu et al. |
| 2004/0174997 | A1* | 9/2004 | Yamamichi et al. ............ 380/44 |
| 2004/0229597 | A1* | 11/2004 | Patel ............................ 455/411 |
| 2008/0137865 | A1* | 6/2008 | Sabet-Sharghi et al. ...... 380/277 |
| 2010/0275036 | A1 | 10/2010 | Harada et al. |
| 2011/0164753 | A1* | 7/2011 | Dubhashi et al. ............. 380/282 |
| 2012/0023329 | A1* | 1/2012 | Yamamoto et al. ........... 713/158 |
| 2012/0102319 | A1* | 4/2012 | Falk et al. ..................... 713/156 |
| 2012/0136999 | A1* | 5/2012 | Roitshtein et al. ............ 709/225 |
| 2012/0159575 | A1 | 6/2012 | Fukui et al. |

OTHER PUBLICATIONS

4C Entity: "Content Protection for eXtended Media Specification; SD Memory Card Book Comnon Part", Sep. 27, 2010, XP007922643, Retrieved from the Internet: URL:http://www.4centity.com/specification. aspx [retrieved on Apr. 4, 2014] cited in the application Sections 3.2.2, 3.4 and 3.4.1.

Ahmed M., et al.,"Above the Trust and Security in Cloud Computing: A Notion Towards Innovation", Embedded and Ubiquitous Computing (EUC), 2010 IEEE/IFIP 8th International Conference on, IEEE, Dec. 11, 2010, pp. 723-730, XP031886314, DOI: 10.1109/EUC.2010.114 ISBN: 978-1-4244-9719-5 p. 726, right-hand column, line 5—p. 727, right-hand column, line 20.

Focardi R., et al.,"Static Analysis of Authentication", Jan. 1, 2005, Foundations of Security Analysis and Design III Lecture Notes in Computer Science; LNCS, Springer, Berlin, DE, pp. 109-132, XP019018877, ISBN: 978-3-540-28955-5 p. 115, line 3 upto (but not including) section 2.3; p. 116.

International Search Report and Written Opinion—PCT/US2014/011876—ISA/EPO—Apr. 28, 2014.

Menezes, A J., et al., "Chapter 10: Identification and Entity Authentication", Handbook of Applied Cryptography; CRC Press Series on Discrete Mathematics and its Applications, Oct. 1, 1996, XP001525010, pp. 385-424.

* cited by examiner

METHODS AND DEVICES FOR AUTHENTICATION AND KEY EXCHANGE

CLAIM OF PRIORITY

The present application for patent claims priority to provisional application No. 61/762,198 entitled "Countermeasures Against Security Weaknesses in CPRM Compliance" filed Feb. 7, 2013, the entire disclosure of which is hereby expressly incorporated by reference.

BACKGROUND

1. Field

Various features pertain to securing content, and more specifically, improving security measures for content protection for recordable media standards.

2. Background

Many security algorithms exist for securing content (e.g., copyrighted music, videos, programming, sensitive data, etc.) on recordable media (e.g., memory circuit, digital storage devices, etc.). For example, a content provider may wish to limit a storage device from transmitting copyrighted content to another unauthorized communication device. As such, the content provider may establish a cryptographic security algorithm onto the storage device that authenticates other communication devices requesting the content from the storage device prior to allowing the storage device to transmit the content to the requesting communication device. Authenticating the requesting communication device prior to content transmission attempts to secure the content from being distributed without permission.

Despite the myriad of security algorithms that help secure against unauthorized data transmission, many have security vulnerabilities that can be discovered and exploited by an astute, rogue party. One such security vulnerability that exists in some security algorithms is explained in FIG. 1.

FIG. 1 illustrates a security algorithm protocol found in the prior art. Specifically, FIG. 1 illustrates a method step flow diagram 100 of a mutual authentication and key exchange (AKE) between an accessing device 102 and a rogue storage device 104. In this example, the accessing device 102 is an authorized recording device that desires to record copyrighted content and/or content subject to restrictions onto another authorized storage device using the AKE. The AKE utilizes a symmetric key cipher algorithm to authenticate authorized communication devices, such as the accessing device 102 and other authorized storage devices. Authorized storage devices include, for example, non-volatile memory circuits (e.g., FLASH, Secure Digital (SD) Cards, etc.) that store secure content. In the illustrated example, the rogue storage device 104 may be any communication device that is posing as an authorized storage device.

Referring to FIG. 1, the accessing device 102 unsuspectingly wishes to record content to the rogue storage device 104. However, before doing so the accessing device 102 must authenticate the storage device 104. As such, the accessing device 102 begins the AKE process by generating (or is otherwise provided) a symmetric key $K_{mu}$ 106 (ordinarily an authorized storage device would also have a copy of the symmetric key $K_{mu}$). Then, the accessing device 102 generates and transmits a first authentication challenge 108 to the rogue storage device 104. The first authentication value is a random number encrypted using an encryption cipher algorithm and the key $K_{mu}$. Instead of generating its own unique second authentication challenge with another random number, the rogue storage device 104 sets its second authentication challenge equal to the first authentication challenge received 110. Note that the rogue storage device 104 is presumed not to have the symmetric key $K_{mu}$ that other authorized storage devices would ordinarily use to generate unique authentication challenges. The rogue storage device 104 then transmits the second authentication challenge 112 to the accessing device 102. The accessing device 102 generates a response $R_2$ based on and in response to the second authentication challenge 114. For example, the response $R_2$ is given by formula (1):

$$R_2 = E_x(K_{mu}, AC_2) \text{XOR} AC_2 \tag{1}$$

where $AC_2$ is the second authentication challenge, XOR is the exclusive OR operation, and $E_x$ is an encryption cipher algorithm. The accessing device 102 then transmits 116 the response $R_2$ to the rogue storage device 104.

Authorized storage devices then ordinarily generate and transmit a unique response to the first authentication challenge received from the accessing device. However, instead of generating the response itself directly using the received first challenge, symmetric key $K_{mu}$, and the cipher algorithm $E_x$, the rogue storage device 104 sets its response $R_1$ equal to the response $R_2$ 118, and sends the response $R_1$ 120 to the accessing device 102. Since both the first authentication challenge and the second authentication challenge are equal to one another, the expected responses $R_1$ and $R_2$ to the authentication challenges should also be equal to one another. Thus, the accessing device 102 unwittingly verifies the response $R_1$ it receives from the rogue storage device 104 as being the correct response to its issued first authentication challenge and consequently authenticates 122 the storage device 104. After successful authentication the accessing device 102 records the content 124 (which may be encrypted using a title key $K_t$ unknown to the rogue storage device 104) onto the rogue storage device 104. One or more additional steps not shown in FIG. 1 may take place after authentication 122 at the accessing device 102 and the storage device 104 in order to generate additional keys, such as a session key $K_S$ that is used to encrypt the title key $K_t$ that may have been used to encrypt the content. The rogue storage device 104 may then distribute the encrypted content to other accessing devices, such as playback devices, that can derive the session and symmetric keys necessary to decrypt and play the content without proper authorization.

One example of a content protection scheme that utilizes a very similar AKE protocol to the one described above, and thus suffers from the same vulnerabilities, is the Content Protection for Recordable Media (CPRM), Content Protection for Pre-recorded Media (CPPM), and the Content Protection for Extended Media (CPXM) standards developed by the 4C Entity, LLC (a Delaware, USA corporation). Documents that describe the aforementioned CPRM/CPPM and CPXM standards (all herein after referred to simply as "CPRM") include, but are not limited to: *Content Protection for Recordable Media Specification: Introduction and Common Cryptographic Elements*, revision 1.1 (December 2010); *Content Protection for Recordable Media Specification: SD Memory Card Book—Common Part*, revision 0.97 (December 2010); *Content Protection for Recordable Media Specification: SD Memory Card Book—SD-Binding Part*, revision 0.92 (December 2005); *Content Protection for Recordable Media Specification: SD Memory Card Book—SD-Video Part*, revision 0.96 (June 2006); *Content Protection for eXtended Media Specification (CPXM): Introduction and Common Cryptographic Elements*, revision 0.85 Preliminary Release; *Content Protection for eXtended Media Specification (CPXM): SD Memory Card Book, Common Part*, revision 0.85 Preliminary Release; and *C2 Block Cipher Specification*, revision 1.0, (Jan. 1, 2003).

The CPRM standards are especially vulnerable to the attack described above with respect to FIG. 1 where the rogue device 104 sets the first and second authentication challenges equal to one another. According to the CPRM standards, after successful authentication, a session key $K_S$ is derived by the accessing device and storage device. The session key $K_S$ is given by the formula (2):

$$K_S = E_{C2}(K_{mu}, AC_1 \text{ XOR } AC_2) \quad (2)$$

where $E_{C2}$ is either the Cryptomeria C2 cipher algorithm or Advanced Encryption Standard (AES) algorithm, $AC_1$ is the first authentication challenge, and $AC_2$ is the second authentication challenge (i.e., $K_{mu}$ and $AC_1$ XOR $AC_2$ are inputs to the $E_{C2}$ encryption cipher). If $AC_1 = AC_2$ (e.g., according to the aforementioned attack), then $AC_1$ XOR $AC_2$ will always return a zero (0) value, and thus $K_S$ will always equal $E_{C2}$ ($K_{mu}$, 0) regardless of what specific value $AC_1$ and $AC_2$ are. Such a constant $K_S$ value poses a major security vulnerability. According to CPRM, once a rogue storage device obtains the encrypted content (e.g., step 124 of FIG. 1), the rogue device may initiate communications with other playback devices and execute the same $AC_1 = AC_2$ scheme to derive the constant session key $K_S$ and decrypt the encrypted content for unauthorized playback on the playback devices.

Thus, there is a need for security protocols, such as improved AKE protocols, that feature increased security against unauthorized content recording, distribution, and playback. Moreover, there is a need to improve the existing AKE protocol used by the CPRM standards to safeguard against at least the security vulnerability described above with respect to FIG. 1.

SUMMARY

One feature provides a method operational on a content accessing device for securing content, the method comprising provisioning the content accessing device with a cryptographic algorithm, generating a symmetric key also known to a content storage device, sending a first authentication challenge to the content storage device, the first authentication challenge based on the cryptographic algorithm and the symmetric key, receiving a second authentication challenge from the content storage device in response to sending the first authentication challenge, determining whether the first authentication challenge is different from the second authentication challenge, and sending a first response to the content storage device in response to the second authentication challenge only if the second authentication challenge is different from the first authentication challenge. According to one aspect, the method further comprises receiving a second response from the content storage device upon sending the first response, and verifying the second response using the first authentication challenge and the symmetric key. According to another aspect, upon successful authentication of the second response the method further comprises providing encrypted content to the storage device for storage, the encrypted content secured with a title key that is encrypted as a function of a session key generated from the first and second authentication challenges.

According to one aspect, upon successful authentication of the second response the method further comprises retrieving encrypted content from the storage device, the encrypted content secured with a title key that is encrypted as a function of a session key generated from the first and second authentication challenges. According to another aspect, the symmetric key is derived from a media identifier received from the storage device and a media key, the media key derived in part by at least one of a plurality of media key blocks (MKB) received from the storage device. According to yet another aspect, the second authentication challenge is also based on the cryptographic algorithm and the symmetric key.

Another feature provides a content accessing device comprising a communication interface configured to communicate with a content storage device, a memory circuit communicatively coupled to the communication interface, the memory circuit configured to store a cryptographic algorithm, and a processing circuit communicatively coupled to the communication interface and the memory circuit. The processing circuit is configured to generate a symmetric key also known to the content storage device, send a first authentication challenge to the content storage device, the first authentication challenge based on the cryptographic algorithm and the symmetric key, receive a second authentication challenge from the content storage device in response to sending the first authentication challenge, determine whether the first authentication challenge is different from the second authentication challenge, and send a first response to the content storage device in response to the second authentication challenge only if the second authentication challenge is different from the first authentication challenge. According to one aspect, the processing circuit is further configured to receive a second response from the content storage device upon sending the first response, and verify the second response using the first authentication challenge and the symmetric key. According to another aspect, upon successful authentication of the second response the processing circuit is further configured to provide encrypted content to the storage device for storage, the encrypted content secured with a title key that is encrypted as a function of a session key generated from the first and second authentication challenges.

According to one aspect, upon successful authentication of the second response the processing circuit is further configured to retrieve encrypted content from the storage device, the encrypted content secured with a title key that is encrypted as a function of a session key generated from the first and second authentication challenges. According to another aspect, the symmetric key is derived from a media identifier received from the storage device and a media key, the media key derived in part by at least one of a plurality of media key blocks (MKB) received from the storage device. According to yet another aspect, the second authentication challenge is also based on the cryptographic algorithm and the symmetric key.

Another feature provides a content accessing device comprising means for provisioning the content accessing device with a cryptographic algorithm, means for generating a symmetric key also known to a content storage device, means for sending a first authentication challenge to the content storage device, the first authentication challenge based on the cryptographic algorithm and the symmetric key, means for receiving a second authentication challenge from the content storage device in response to sending the first authentication challenge, means for determining whether the first authentication challenge is different from the second authentication challenge, and means for sending a first response to the content storage device in response to the second authentication challenge only if the second authentication challenge is different from the first authentication challenge. According to one aspect, the content accessing device further comprises means for receiving a second response from the content storage device upon sending the first response, and means for verifying the second response using the first authentication challenge and the symmetric key. According to another aspect, upon successful authentication of the second response the content accessing device further comprises means for providing encrypted content to the storage device for storage, the encrypted content secured with a title key that is encrypted as a function of a session key generated from the first and second authentication challenges. According to yet another aspect, wherein upon successful authentication of the second response the content accessing device further comprises means for retrieving encrypted content from the storage device, the encrypted content secured with a title key that is encrypted as a function of a session key generated from the first and second authentication challenges.

Another feature provides a computer-readable storage medium having instructions stored thereon for securing content by a content storage device, the instruction which when executed by at least one processor causes the processor to provision the content accessing device with a cryptographic algorithm, generate a symmetric key also known to a content storage device, send a first authentication challenge to the content storage device, the first authentication challenge based on the cryptographic algorithm and the symmetric key, receive a second authentication challenge from the content storage device in response to sending the first authentication challenge, determine whether the first authentication challenge is different from the second authentication challenge, and send a first response to the content storage device in response to the second authentication challenge only if the second authentication challenge is different from the first authentication challenge. According to one aspect, the instructions when executed by the processor further cause the processor to receive a second response from the content storage device upon sending the first response, and verify the second response using the first authentication challenge and the symmetric key. According to another aspect, upon successful authentication of the second response the instructions which when executed by the processor further cause the processor to provide encrypted content to the storage device for storage, the encrypted content secured with a title key that is encrypted as a function of a session key generated from the first and second authentication challenges. According to yet another aspect, upon successful authentication of the second response the instructions which when executed by the processor further cause the processor to retrieve encrypted content from the storage device, the encrypted content secured with a title key that is encrypted as a function of a session key generated from the first and second authentication challenges.

Another feature provides a method operational on a first device for securing protected content comprising provisioning the first device with a cryptographic algorithm, generating a symmetric key also known to a second device, sending a first authentication challenge to the second device, the first authentication challenge based on the cryptographic algorithm and the symmetric key, receiving a second authentication challenge from the second device in response to sending the first authentication challenge, generating a first response to the second authentication challenge using a first response generation function, sending the first response to the second device, and receiving a second response to the first authentication challenge from the second device, the second response generated using a second response generation function, wherein the first response generation function and the second response generation function generate different output values in response to one or more identical input authentication challenges. According to one aspect, the second authentication challenge is also based on the cryptographic algorithm and the symmetric key. According to another aspect, the first response generation function includes a first key modifier function that generates a first modified key as a function of the symmetric key, the first modified key different than the symmetric key, and the method further comprises generating the first response based on the first modified key.

According to one aspect, the second response received is generated based on the symmetric key. According to another aspect, the second response received is generated based on a second modified key, the second modified key a function of the symmetric key, the second modified key different than the first modified key. According to yet another aspect, the first key modifier function generates the first modified key based on the symmetric key by at least one of (a) bit rotating at least a portion of the symmetric key, (b) XORing at least a portion of the symmetric key with a fixed non-zero mask, and/or (c) adding or subtracting an arithmetic constant to the symmetric key.

According to one aspect, the first key modifier function is a key derivation function that uses a random or pseudorandom function to generate the first modified key. According to another aspect, the first response generation function includes a first cryptographic encryption function and the second response generation function includes a second cryptographic encryption function, the first cryptographic encryption function different than the second cryptographic encryption function, and the method further comprises generating the first response using the first cryptographic encryption function, and the second response is generated using the second cryptographic encryption function.

Another feature provides a first device for securing protected content that comprises a communication interface configured to communicate with a second device, a memory circuit communicatively coupled to the communication interface, the memory circuit configured to store a cryptographic algorithm, and a processing circuit communicatively coupled to the memory circuit and the communication interface. The processing circuit is configured to generate a symmetric key also known to the second device, send a first authentication challenge to the second device, the first authentication challenge based on the cryptographic algorithm and the symmetric key, receive a second authentication challenge from the second device in response to sending the first authentication challenge, generate a first response to the second authentication challenge using a first response generation function, send the first response to the second device, and receive a second response to the first authentication challenge from the second device, the second response generated using a second response generation function, wherein the first response generation function and the second response generation function generate different output values in response to one or more identical input authentication challenges. According to one aspect, the second authentication challenge is also based on the cryptographic algorithm and the symmetric key. According to another aspect, the first response generation function includes a first key modifier function that generates a first modified key as a function of the symmetric key, the first modified key different than the symmetric key, and the processing circuit is further configured to generate the first response based on the first modified key. According to yet another aspect, the first response generation function includes a first cryptographic encryption function and the second response generation function includes a second cryptographic encryption function, the first cryptographic encryption function different than the second cryptographic encryption function, and the processing circuit is further configured to generate the first response using the first cryptographic encryption function, and the second response is generated using the second cryptographic encryption function.

Another feature provides a first device for securing protected content that comprises means for provisioning the first device with a cryptographic algorithm, means for generating a symmetric key also known to a second device, means for sending a first authentication challenge to the second device, the first authentication challenge based on the cryptographic algorithm and the symmetric key, means for receiving a second authentication challenge from the second device in response to sending the first authentication challenge, means for generating a first response to the second authentication challenge using a first response generation function, means for sending the first response to the second device, and means for receiving a second response to the first authentication challenge from the second device, the second response generated using a second response generation function, wherein the first response generation function and the second response generation function generate different output values in response to one or more identical input authentication challenges. According to one aspect, the first response generation function includes a first key modifier function that generates a first modified key as a function of the symmetric key, the first modified key different than the symmetric key, and the first device further comprises means for generating the first response based on the first modified key.

Another feature provides a computer-readable storage medium having instructions stored thereon for securing protected content on a first device, the instructions which when executed by at least one processor cause the processor to provision the first device with a cryptographic algorithm, generate a symmetric key also known to a second device, send a first authentication challenge to the second device, the first authentication challenge based on the cryptographic algorithm and the symmetric key, receive a second authentication challenge from the second device in response to sending the first authentication challenge, generate a first response to the second authentication challenge using a first response generation function, send the first response to the second device, and receive a second response to the first authentication challenge from the second device, the second response generated using a second response generation function, wherein the first response generation function and the second response generation function generate different output values in response to one or more identical input authentication challenges. According to one aspect, the first response generation function includes a first key modifier function that generates a first modified key as a function of the symmetric key, the first modified key different than the symmetric key, and the instructions when executed by the processor further cause the processor to generate the first response based on the first modified key.

DETAILED DESCRIPTION

In the following description, specific details are given to provide a thorough understanding of the various aspects of the disclosure. However, it will be understood by one of ordinary skill in the art that the aspects may be practiced without these specific details. For example, circuits may be shown in block diagrams in order to avoid obscuring the aspects in unnecessary detail. In other instances, well-known circuits, structures and techniques may not be shown in detail in order not to obscure the aspects of the disclosure.

The word "exemplary" is used herein to mean "serving as an example, instance, or illustration." Any implementation or aspect described herein as "exemplary" is not necessarily to be construed as preferred or advantageous over other aspects of the disclosure.

Overview

One feature pertains to a content accessing device for securing content. The content accessing device is provisioned with a cryptographic algorithm, and generates a symmetric key also known to a content storage device. The content accessing device sends a first authentication challenge to the content storage device, where the first authentication challenge is based on the cryptographic algorithm and the symmetric key. The content accessing device receives a second authentication challenge from the content storage device in response to sending the first authentication challenge, and determines whether the first authentication challenge is different from the second authentication challenge. If the second authentication challenge is different from the first authentication challenge the content accessing device sends a first response to the content storage device in response to the second authentication challenge.

Another feature pertains to a first device for securing protected content. The first device is provisioned with a cryptographic algorithm, and generates a symmetric key also known to a second device. The first device sends a first authentication challenge to the second device, where the first authentication challenge is based on the cryptographic algorithm and the symmetric key. The first device also receives a second authentication challenge from the second device in response to sending the first authentication challenge, and generates a first response to the second authentication challenge using a first response generation function. The first device further sends the first response to the second device. A second response to the first authentication challenge is then received by the first device from the second device. The second response is generated using a second response generation function, where the first response generation function and the second response generation function generate different output values in response to one or more identical input authentication challenges.

Exemplary Operating Environment

Figure 2:
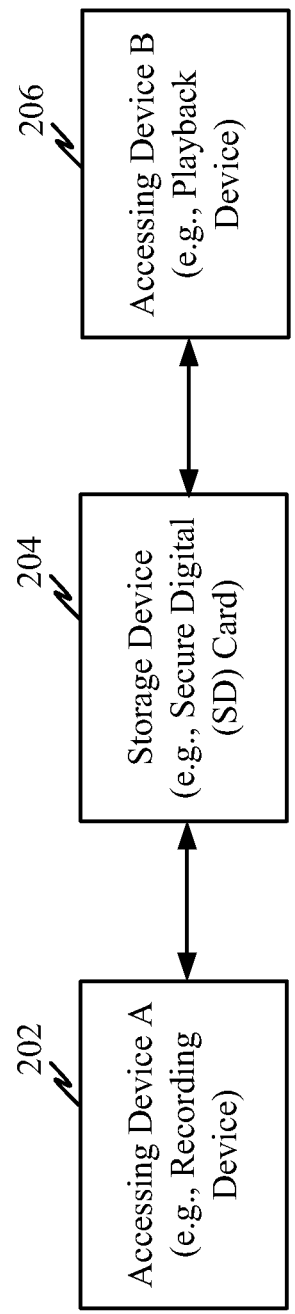
FIG. 2 illustrates a schematic block diagram of a first exemplary environment in which one or more aspects herein may be implemented.

FIG. 2 illustrates a schematic block diagram of a first exemplary environment in which one or more aspects herein may be implemented. Specifically, an accessing device A 202 and an accessing device B 206 are in communication (wireless or wired) with a storage device 204. Accessing devices A and B 202, 206 may be any electronic communication device that is capable of communicating with a storage device, such as non-volatile memory, SD cards, disk drives, magnetic storage media, etc. Examples of accessing devices include, but are not limited to, mobile phones, smartphones, digital music players, digital recorders, laptops, tablets, wireless electronic eyeglasses, etc. In the illustrated example, accessing device A 202 may be a recording device, such as a laptop or a digital recorder, and accessing device B 206 may be a playback device, such as a digital music player or mobile phone. According to one example, the accessing device A 202 may obtain content, encrypt it, and then desire to store it on the storage device 204 (e.g., SD card). The encrypted content may subsequently be decrypted and accessed from the storage device 204 by the accessing device B 206. According to one aspect, the recording device 202 and playback device 206 may be the same device. For example, a laptop or mobile phone may be able to both record content and play it back.

Exemplary AKE Protocols, Accessing Devices, and Storage Devices

Figure 3:
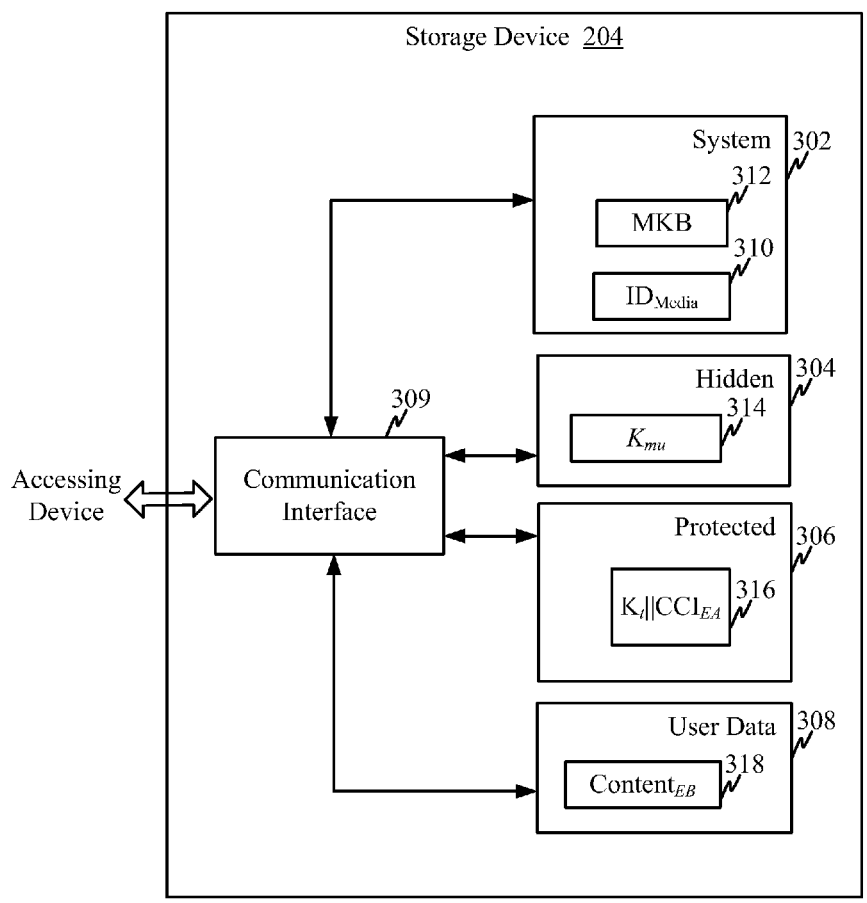
FIG. 3 illustrates an example of the storage device.

FIG. 3 illustrates an example of the storage device 204 according to one aspect. The storage device 204 may be a non-volatile memory circuit, such as FLASH memory or an SD card. The storage device 204 includes different areas that are partitioned logically and/or in hardware. For example, the storage device 204 may include a system area 302, a hidden area 304, a protected area 306, and a user data area 308. The storage device 204 also includes a communication interface 309 that allows for communication with other accessing devices (e.g., accessing device A 202 and accessing device B 206).

The system area 302 may be a memory area that is accessible from any device without using any secret data or authentication. The system area 302 may include a media identifier ($ID_{Media}$) 310 and a plurality of media key blocks (MKB) 312. The $ID_{Media}$ may be a 64-bit value and the MKBs are a series of columns and rows of values that can be used by an accessing device to generate a media key $K_m$. Examples of MKBs and $ID_{Media}$ value structures may be found according to CPRM specifications.

The hidden area 304 is an area of memory that can be used only by the storage device 204 itself. It may store a plurality of media unique keys $K_{mu}$ 314 that each correspond to the plurality of MKBs 312. The media unique keys $K_{mu}$ may be, for example, 56-bit values. Examples of media unique keys $K_{mu}$ and associated hidden area 304 data may be found in the CPRM specifications.

The protected area 306 is a memory area that may be accessible only after successful authentication between the storage device 204 and an accessing device 202, 206. The protected area 306 may store encrypted title keys $K_t$ 316, encrypted copy control information (CCI) 316, and/or encrypted usage rules. Examples of title keys, CCI, and usage rules may be found in the CPRM specifications.

The user data area 308 is large portion of the storage device 204 that stores content and user data. It is visible to the user accessing the storage device 204. The user data area 308 may include, among other things, encrypted content 318.

Figure 4:
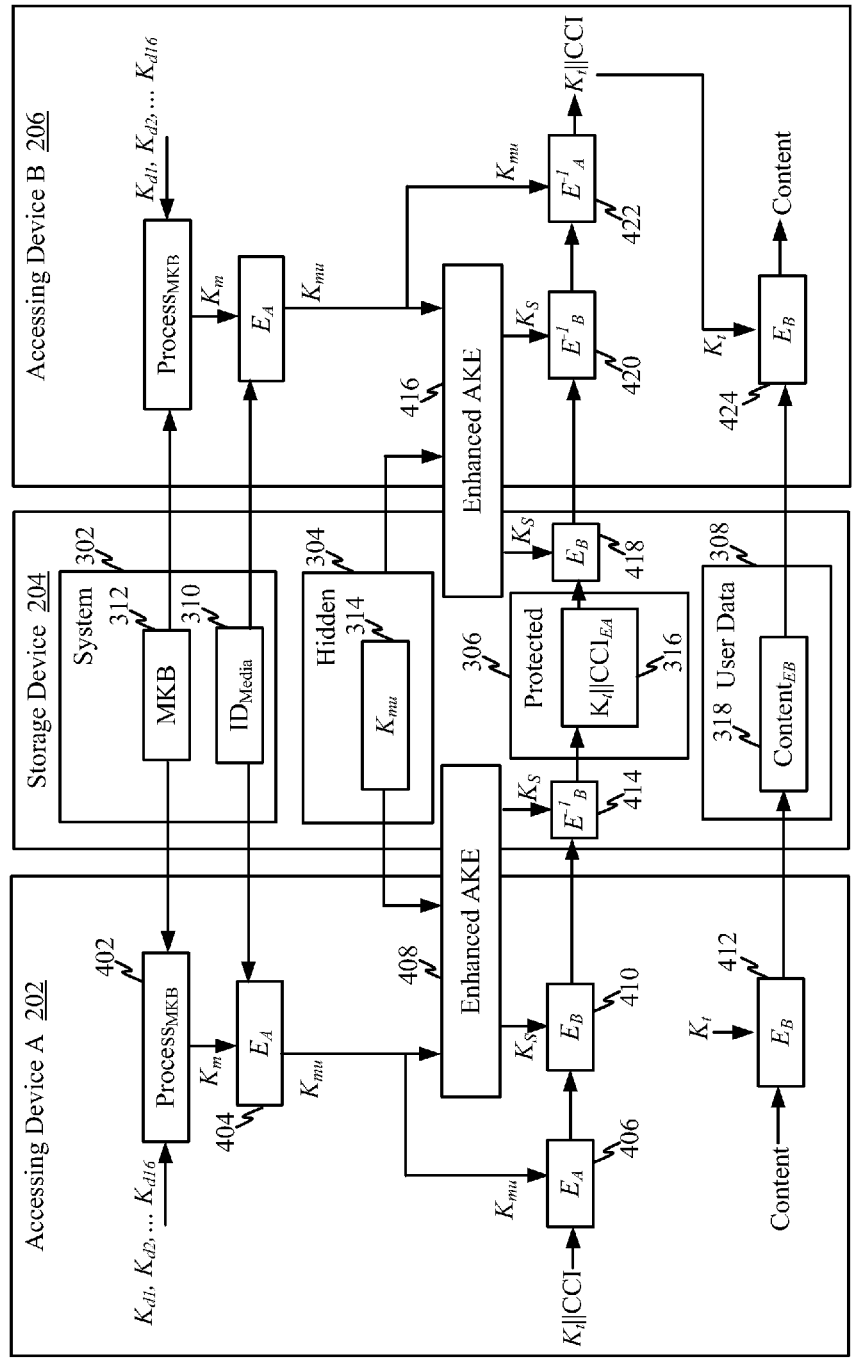
FIG. 4 illustrates a non-limiting example of a schematic block diagram of one implementation of security protocols and processes associated with accessing devices A and B and the storage device.

FIG. 4 illustrates a non-limiting example of a schematic block diagram of one implementation of security protocols and processes associated with accessing devices A and B 202, 206 and the storage device 204 according to one aspect of the disclosure. As one example, accessing device A 202 stores a plurality (e.g., sixteen (16)) of device keys $K_{d1}$, $K_{d2}$, ... $K_{d16}$ that in conjunction with the MKBs 312 are used by the $Process_{MKB}$ 402 to generate the media key $K_m$. Next, a first encryption block $E_A$ 404 generates the symmetric media unique key $K_{mu}$ based on the media key $K_m$ and $ID_{Media}$ 310. The media unique key $K_{mu}$ is used by a second encryption block $E_A$ 406 to encrypt the title key $K_t$ and CCI. The first and second encryption blocks $E_A$ 404, 406 may be, for example, the Cryptomeria C2 encryption algorithm in Electronic Codebook mode (ECM).

Accessing device A 202 and the storage device 204 execute an enhanced AKE 408 (as will be described in further detail herein) that generates a session key $K_S$. The encrypted key $K_t$ and CCI is further encrypted via a third encryption block $E_B$ 410 using the session key $K_S$. The title key $K_t$ is also used by a fourth encryption block $E_B$ 412 to encrypt content that the accessing device A 202 desires to store on the storage device 204. The third and fourth encryption blocks $E_B$ 410, 412 may be, for example, the Cryptomeria C2 encryption cipher algorithm using Converted Cipher Block Chaining (C-CBC) mode.

After successful Enhanced AKE 408, the storage device 204 decrypts the double encrypted title key $K_t$ and CCI using the session key $K_S$ and a first decryption block 414 and stores the result in its protected memory 306. The decryption block 414 may be, for example, the Cryptomeria C2 decryption cipher algorithm in C-CBC mode.

If accessing device B 206 desires to receive the content stored on the storage device 204 for playback, it similarly generates a symmetric key $K_{mu}$ and authenticates itself with the storage device using the enhanced AKE process 416 before it generates a session key $K_S$. Once authenticated accessing device B 206 and storage device 204 execute utilize encryption/decryption modules 418, 420, 422, 424 to recover the title key $K_t$ and CCI in order to decrypt the encrypted content for playback.

Figure 1:
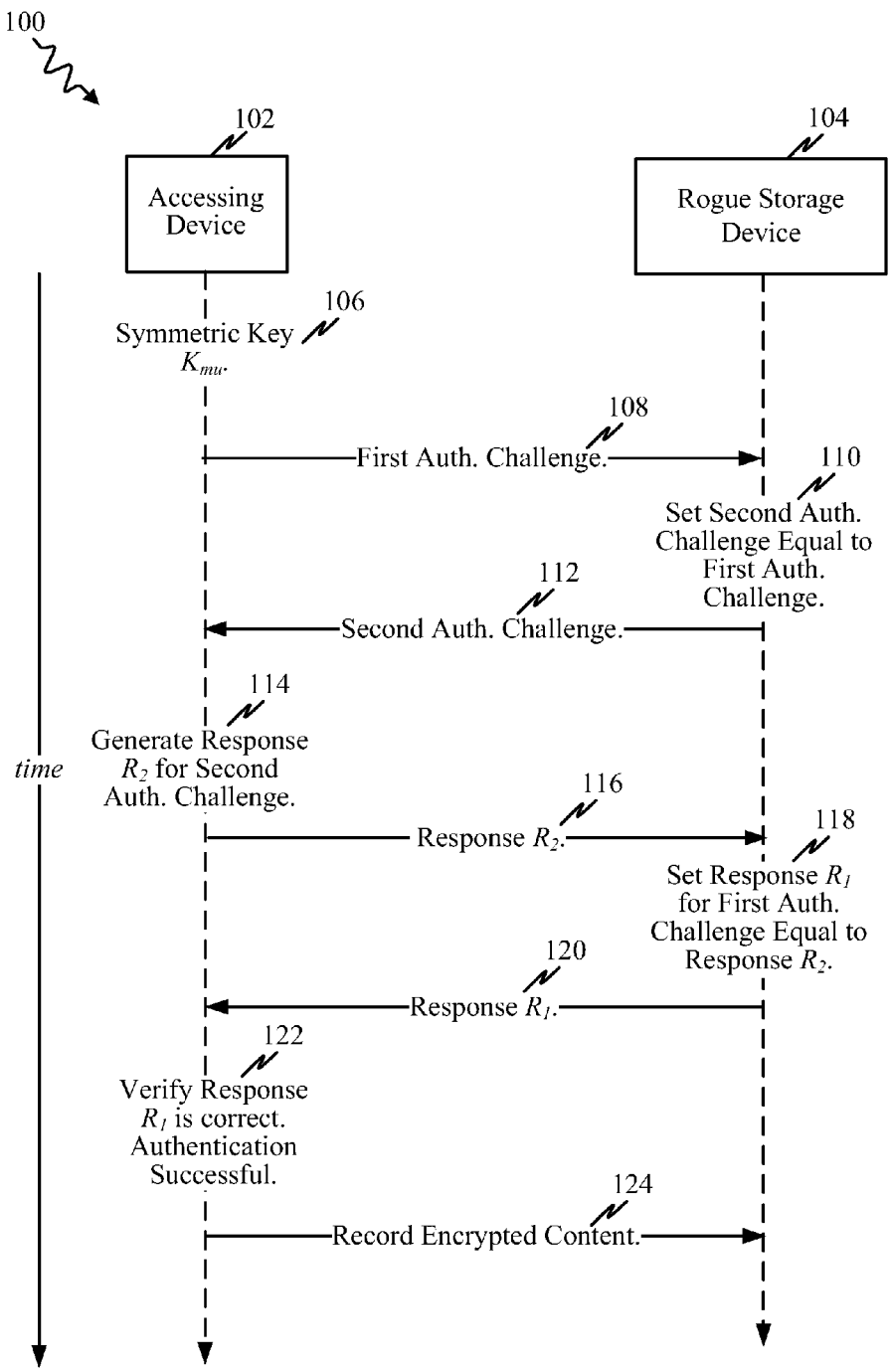
FIG. 1 illustrates a security algorithm protocol found in the prior art.

As will be described below, various enhanced AKE processes 408, 416 close security vulnerabilities of some prior art AKE processes that are susceptible to attacks like the one described above with respect to FIG. 1.

Figure 5:
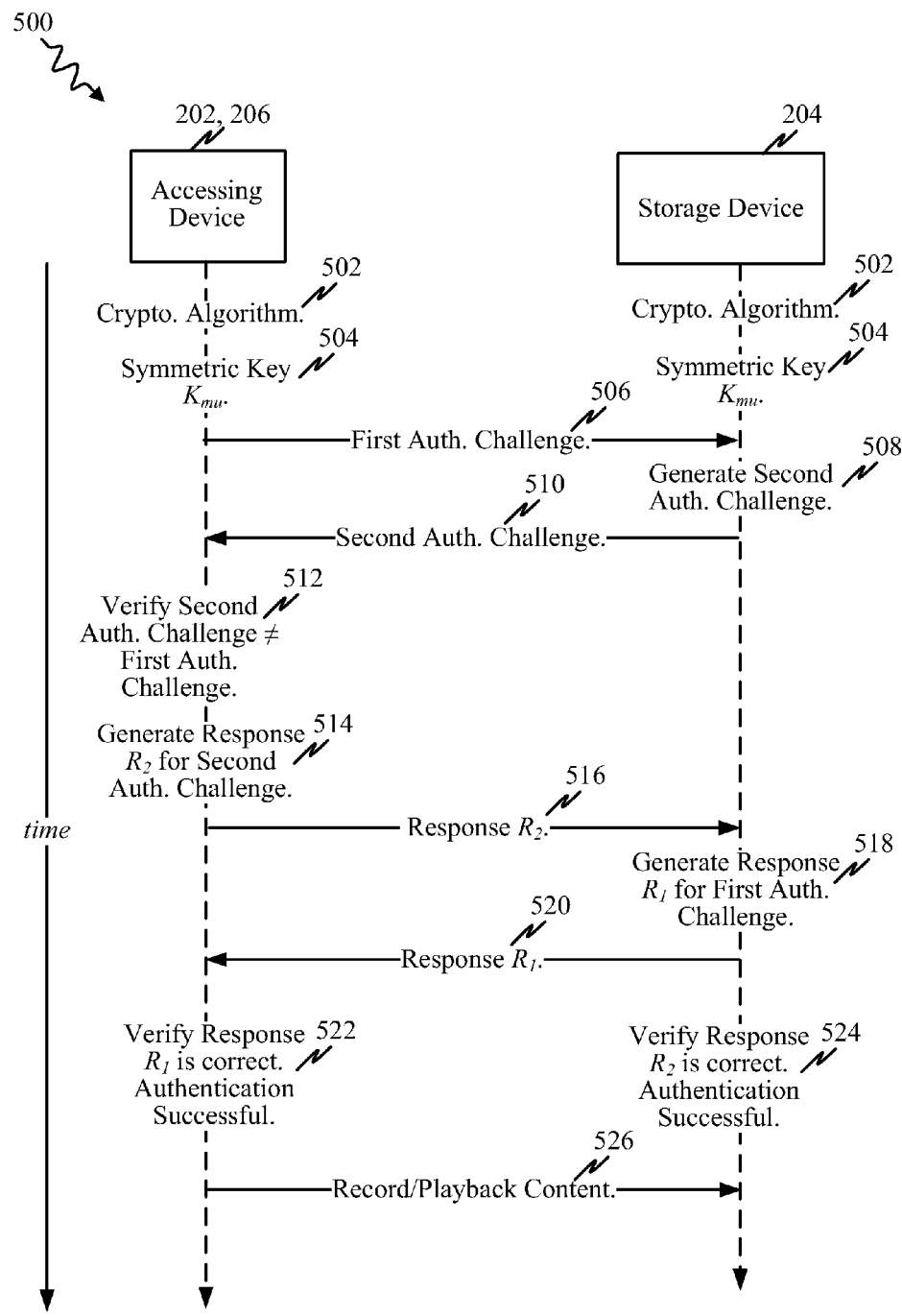
FIG. 5 illustrates a process flow diagram of the enhanced AKE between an accessing device and the storage device.

FIG. 5 illustrates a process flow diagram 500 of the enhanced AKE 408, 416 between an accessing device 202, 206 and the storage device 204 according to one aspect. The accessing device 202, 206 and the storage device 204 are both provisioned with the same cryptographic algorithm (e.g., AES, Cryptomeria, etc.) 502 that may be used to generate random numbers, and perform encryption and decryption operations. The accessing device 202, 206 begins the Enhanced AKE process 408, 416 by generating the symmetric key $K_{mu}$ 504, which is also stored on the storage device 204. The accessing device 202, 206 then generates and transmits a first authentication challenge 506 to the storage device 204. The first authentication challenge may be a random number encrypted using the encryption algorithm 502 and the symmetric key $K_{mu}$. Similarly, the storage device 204 also generates 508 and transmits 510 a second authentication challenge to the accessing device 202, 206. The second authentication challenge may be a random number encrypted using the encryption algorithm 502 and the symmetric key $K_{mu}$. Notably, prior to generating a response to the second authentication challenge, the accessing device 202, 206 verifies 512 that the second authentication challenge received does not equal the first authentication challenge sent. If the two challenges are indeed equal then the authentication process is aborted, or alternatively the accessing device 202, 206 requests that another authentication challenge be sent by the storage device 204.

Assuming that the second challenge does not equal the first challenge, the accessing device 202, 206 generates a response $R_2$ based on and in response to the second authentication challenge 514. For example, the response $R_2$ may be given by formula (3):

$$R_2 = E_{C2}(K_{mu}, AC_2) \text{XOR} AC_2 \quad (3)$$

where $AC_2$ is the second authentication challenge and $E_{C2}$ is an encryption cipher algorithm (e.g., Cryptomeria C2). The accessing device 202, 206 then transmits 516 the response $R_2$ to the storage device 204. Similarly, the storage device 204 generates 518 a response $R_1$ according to formula (4):

$$R_1 = E_{C2}(K_{mu}, AC_1) \text{XOR} AC_1 \quad (4)$$

where $AC_1$ is the first authentication challenge. Next, the storage device 204 sends the response $R_1$ 520 to the accessing device 202, 206. Upon receiving the response $R_1$, the accessing device 202, 206 verifies that the response $R_1$ is correct 522 (e.g., a function of the first authentication value sent). Similarly, the storage device 204 verifies that the response $R_2$ is correct 524 (e.g., a function of the second authentication value sent). After the accessing device 202, 206 and the storage device 204 verify that the responses received are accurate authentication is successful and session keys $K_S$ may be generated. Content may then be recorded/played-back 526 to/from the storage device 204. According to one example, the storage device 204 may verify that response $R_2$ it received from the accessing device 202, 206 is correct before generating and/or transmitting response $R_1$ to the accessing device (i.e., step 524 is performed before step 520 and/or step 518).

Figure 6:
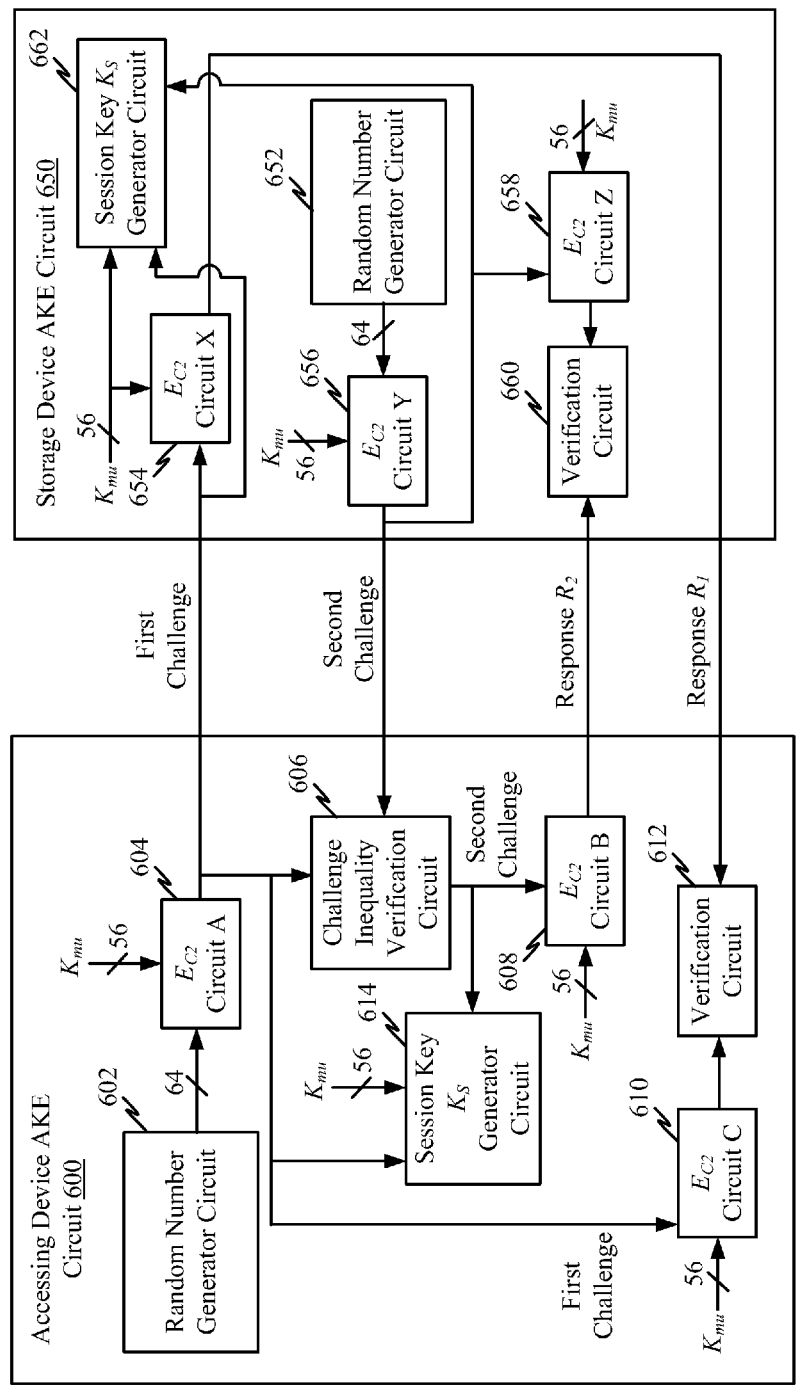
FIG. 6 illustrates a schematic block diagram of an accessing device's Enhanced AKE circuit in communication with a storage device's Enhanced AKE circuit.

FIG. 6 illustrates a schematic block diagram of an accessing device's Enhanced AKE circuit 600 in communication with a storage device's Enhanced AKE circuit 650 according to one aspect. The accessing device's AKE circuit 600 may include a random number generator 602, encryption $E_{C2}$ circuit A 604, challenge inequality verification circuit 606, encryption $E_{C2}$ circuit B 608, encryption $E_{C2}$ circuit C 610, and a verification circuit 612. The storage device's AKE circuit 650 may include a random number generator 652, encryption $E_{C2}$ circuit X 654, encryption $E_{C2}$ circuit Y 656, encryption $E_{C2}$ circuit Z 658, and a verification circuit 660.

The random number generator 602 generates, for example, a 64-bit number that is fed into the encryption $E_{C2}$ circuit A 604. According to one example, the 64-bit random number may be comprised of a 32-bit secure command word and a 32-bit random number concatenated together. Receiving the 64-bit random number and the symmetric key $K_{mu}$ as inputs, the encryption $E_{C2}$ circuit A 604 generates a first authentication challenge that is sent to the storage device's AKE circuit 650. The encryption $E_{C2}$ circuit A 604 may perform a cryptographic encryption function, such as but not limited to the Cryptomeria C2 algorithm.

The challenge inequality verification circuit 606 receives a second authentication challenge from the storage device AKE circuit 650. Like the accessing device 202, 206, the storage device 204 may generate the second challenge by generating a random number using its random number generator circuit 652 and encryption $E_{C2}$ circuit Y 656. The challenge inequality verification circuit 606 determines whether or not the second challenge received from the storage device SKE circuit 650 is equal to the first challenge sent to the storage device AKE circuit 650. If the two challenges are equal then either the authentication process fails/aborts or the accessing device 202, 206 requests a different challenge from the storage device 204. If the two challenges are different values (i.e., not equal) then authentication proceeds and the encryption $E_{C2}$ circuit B 608 generates a response $R_2$ based on the second challenge and $K_{mu}$ (e.g., see formula (3) above), which is then sent to the storage device AKE circuit 650.

Using the encryption $E_{C2}$ circuit X 654, the storage device AKE circuit 650 generates its own response $R_1$ based on the first challenge and $K_{mu}$ (e.g., see formula (4) above), and transmits response $R_1$ to the accessing device 202, 206. The accessing device's verification circuit 612 receives the response $R_1$ and also a locally generated expected response value from the encryption $E_{C2}$ circuit C 610 based on the first challenge and $K_{mu}$. If the received response $R_1$ matches (i.e., is equal) to the locally generated expected response value then the accessing device 202, 206 authenticates the storage device 204. Likewise, the storage device's verification circuit 660 receives the response $R_2$ from the accessing device 202, 206 and also a locally generated expected response value from the encryption $E_{C2}$ circuit Z 658 based on the second challenge and $K_{mu}$. If the received response $R_2$ matches (i.e., is equal) to the locally generated expected response value then the storage device 204 authenticates the accessing device 202, 206.

The accessing device AKE circuit 600 may also include a session key $K_S$ generation circuit 614 that generates the session key $K_S$ based on the first and second challenges and also a key (e.g., $K_{mu}$). According to one example, the session key $K_S$ may be generated according to the formula (2) referenced above. According to other examples, the session key $K_S$ may be generated according to other functions based on the first and second challenges and a key (e.g., $K_{mu}$). The storage device AKE circuit 650 may similarly generate the session key $K_S$ using its own session key generation circuit 662.

The challenge inequality verification circuit 606 serves as one example of a means for determining whether the first authentication challenge is different from the second authentication challenge. The verification circuit 612 serves as one example of a means for verifying the second response using the first authentication challenge and the symmetric key.

Figure 7A:
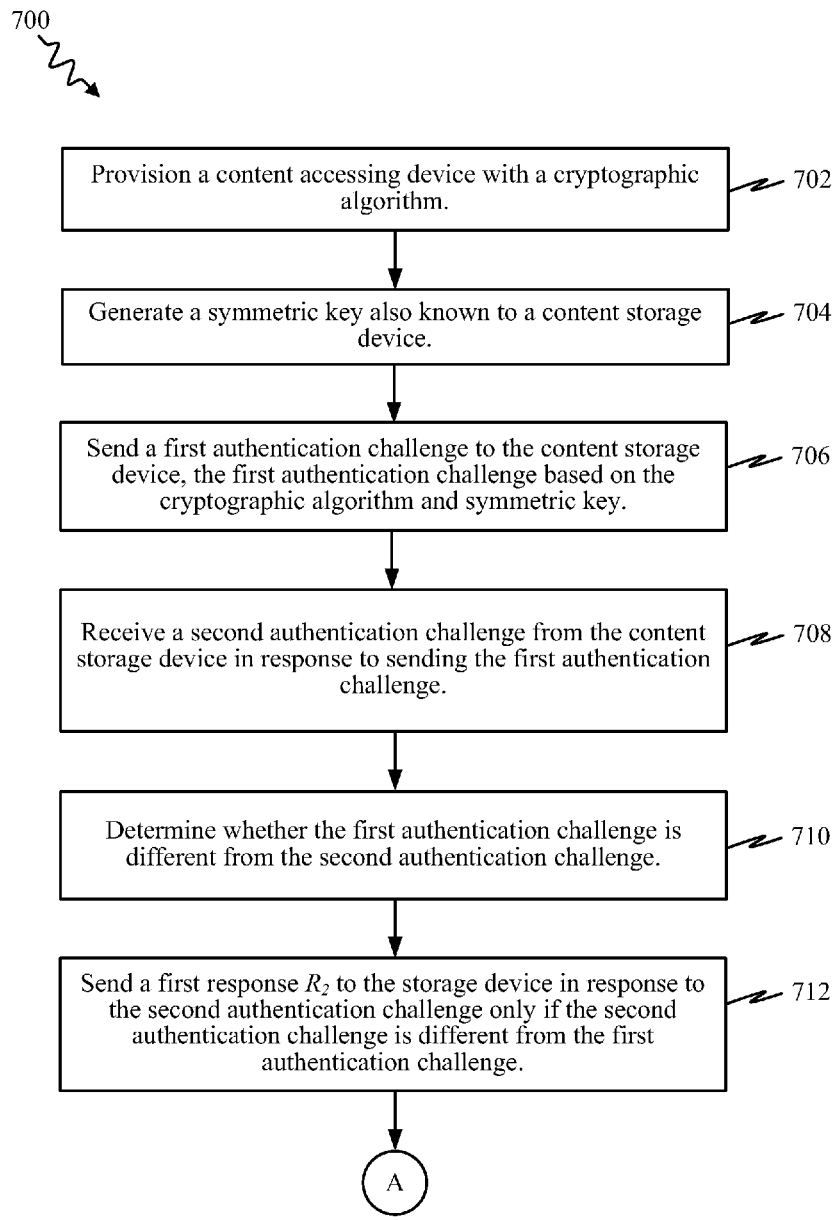
FIGS. 7A and 7B illustrate a method for executing an AKE algorithm on a content accessing device.
Figure 7B:
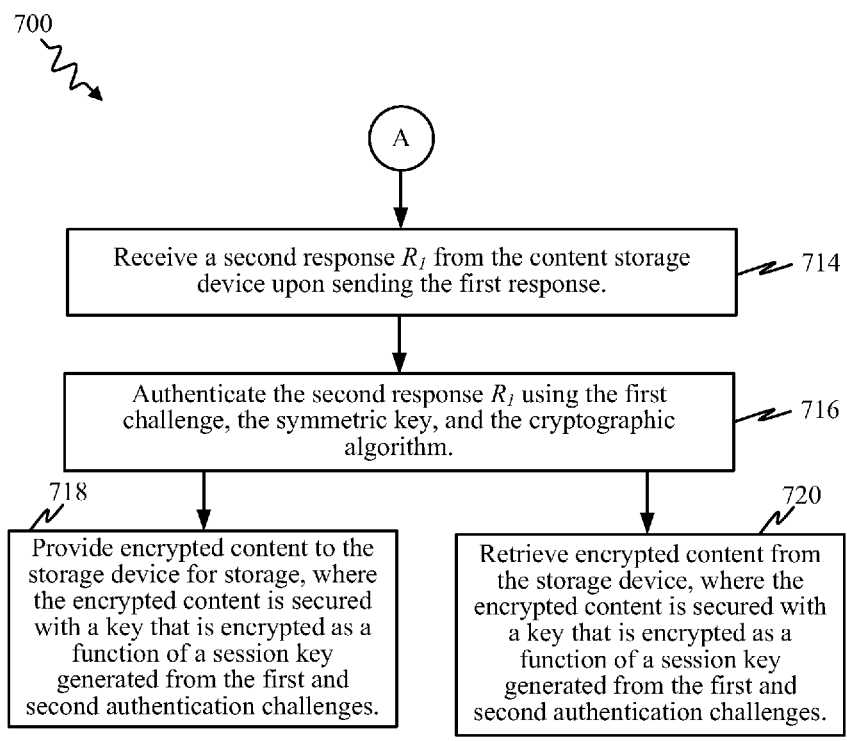

FIGS. 7A and 7B illustrate a method 700 for executing an AKE algorithm on a content accessing device according to one example. A content accessing device is provisioned with a cryptographic algorithm 702, such as AES, data encryption standard (DES), and/or Cryptomeria C2. The content accessing device generates a symmetric key, where the cryptographic algorithm and symmetric key are also known to a content storage device 704. The content accessing device sends a first authentication challenge, based on the cryptographic algorithm and the symmetric key, to the content storage device 706. A second authentication challenge is received by the accessing device from the content storage device in response to sending the first authentication challenge 708. The accessing device determines whether the first authentication challenge is different than the second authentication challenge 710. Notably, the accessing device sends a response $R_2$ (e.g., "first response") to the second authentication challenge only if the second authentication challenge is different from the first authentication challenge 712. The first response may be based on the cryptographic algorithm, symmetric key, and the second authentication challenge. The accessing device receives a response $R_1$ ("second response") from the content storage device upon sending the first response $R_2$ 714. The second response $R_1$ may be authenticated by the accessing device using the first challenge, the symmetric key, and the cryptographic algorithm 716.

In one example, if the accessing device is a recording device, it may provide encrypted content to the storage device for storage upon successful authentication of the second response $R_1$, where the encrypted content is secured with a key (e.g., title key $K_t$) that is encrypted as a function of a session key (e.g., $K_S$) generated from the first and second authentication challenges 718. The title key $K_t$ may also be further encrypted using the symmetric key (e.g., $K_{mu}$) as discussed with reference to FIG. 4.

In another example, if the accessing device is a playback device, it may retrieve encrypted content from the storage device upon successful authentication of the second response $R_1$, where the encrypted content is secured with a key (e.g., title key $K_t$) that is encrypted as a function of a session key (e.g., $K_S$) generated from the first and second authentication challenges 720. The title key $K_t$ may also be further encrypted using the symmetric key (e.g., $K_{mu}$) as discussed with reference to FIG. 4.

Figure 8:
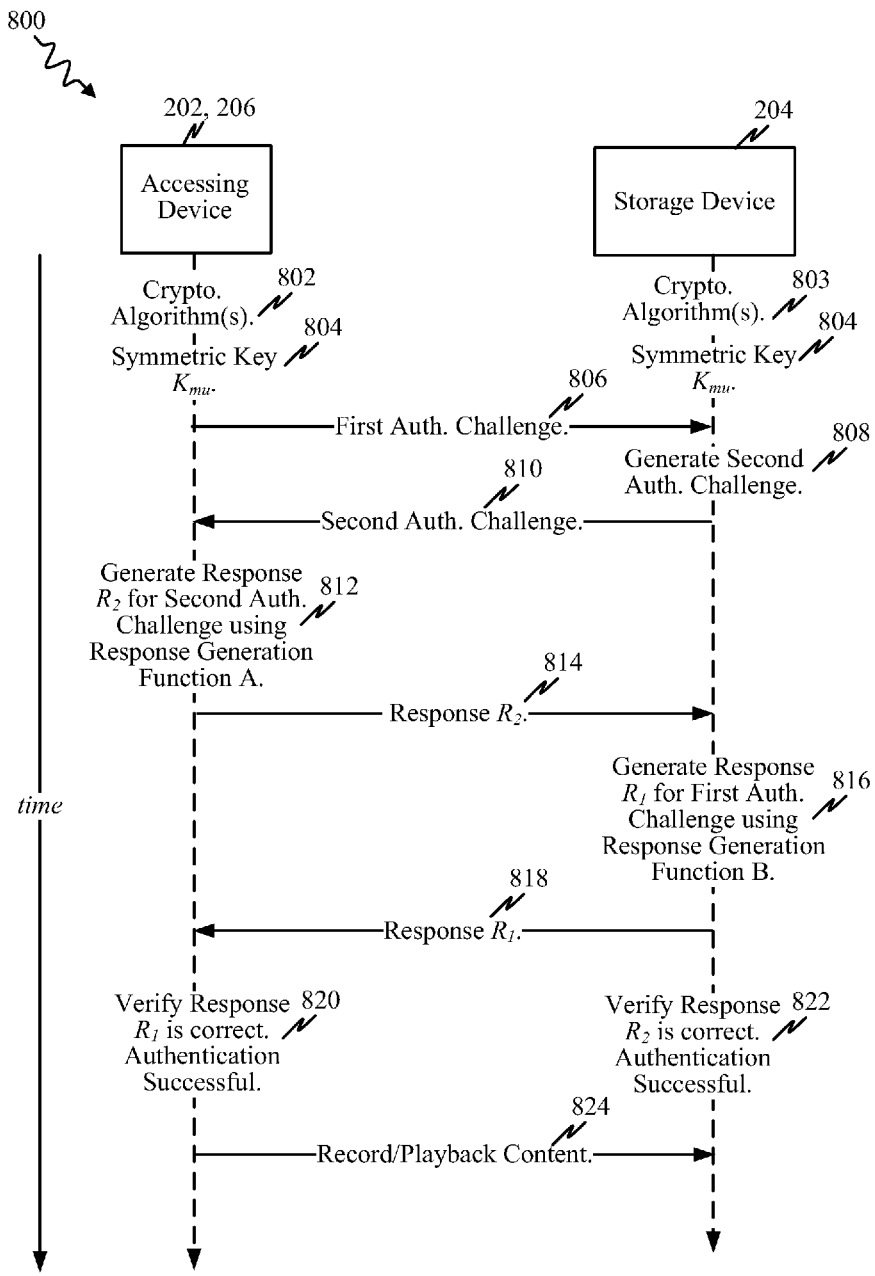
FIG. 8 illustrates a process flow diagram 800 of the enhanced AKE between an accessing device and the storage device.

FIG. 8 illustrates a process flow diagram 800 of the enhanced AKE 408, 416 between an accessing device 202, 206 and the storage device 204 according to another aspect. The accessing device 202, 206 is provisioned with one or more cryptographic algorithms (e.g., AES, Cryptomeria, DES, etc.) 802 that may be used to generate random numbers, and perform encryption and decryption operations. The storage device 204 is also provisioned with one or more cryptographic algorithms (e.g., AES, Cryptomeria, DES, etc.) 803 that may be used to generate random numbers, and perform encryption and decryption operations. In one aspect, the accessing device 202, 206 and the storage device 204 have and use the same cryptographic algorithm(s). In other aspects, they may have at least one different cryptographic algorithm between the two of them.

The accessing device 202, 206 begins the Enhanced AKE process 408, 416 by generating the symmetric key $K_{mu}$ 804, which is also stored on the storage device 204. The accessing device 202, 206 then generates and transmits a first authentication challenge 806 to the storage device 204. The first authentication challenge may be a random number encrypted using the encryption algorithm 802 and the symmetric key $K_{mu}$. Similarly, the storage device 204 also generates 808 and transmits 810 a second authentication challenge to the accessing device 202, 206. The second authentication challenge may be a random number encrypted using the encryption algorithm 802 and the symmetric key $K_{mu}$.

Next, the accessing device 202, 206 generates a response $R_2$ using response generation function A (e.g., "first response generation function") in response to the second authentication challenge 812. As described in greater detail below, response generation function A ($RGF_A$) may generate $R_2$ based on the second authentication challenge and at least one of a modified encryption algorithm and/or a modified symmetric key $K_{mu\_A}$. As just one example, the response $R_2$ may be given by formula (5):

$$R_2 = E_{H\_A}(K_{mu\_A}, AC_2) \text{ XOR } AC_2 \quad (5)$$

where $AC_2$ is the second authentication challenge and $E_{H\_A}$ is an encryption cipher algorithm (e.g., AES, DES, Cryptomeria C2). The accessing device 202, 206 then transmits 814 the response $R_2$ to the storage device 204.

Upon receiving the response $R_2$, the storage device 204 generates a response $R_1$ to the first authentication challenge using response generation function B (e.g., "second response generation function") 816. As described in greater detail below, response generation function B ($RGF_B$) may generate $R_1$ based on the first authentication challenge and at least one of a modified encryption algorithm and/or a modified symmetric key $K_{mu\_B}$. As just one example, the response $R_1$ may be given by formula (6):

$$R_1 = E_{H\_B}(K_{mu\_B}, AC_1) \text{ XOR } AC_1 \quad (6)$$

where $AC_1$ is the first authentication challenge and $E_{H\_B}$ is an encryption cipher algorithm (e.g., AES, DES, Cryptomeria C2). According to one aspect, $K_{mu\_A} \neq K_{mu\_B}$ and/or $E_{H\_A}$ and $E_{H\_B}$ are different encryption algorithms. This causes response $R_1$ and response $R_2$ to be different (i.e., $R_1 \neq R_2$) even if the first authentication challenge is the same (i.e., equal to) the second authentication challenge.

Next, the storage device 204 sends the response $R_1$ 818 to the accessing device 202, 206. Upon receiving the response $R_1$, the accessing device 202, 206 verifies that the response $R_1$ is correct 820 (e.g., a function of the first authentication value sent). Similarly, the storage device 204 verifies that the response $R_2$ is correct 822 (e.g., a function of the second authentication value sent). After the accessing device 202, 206 and the storage device 204 verify that the responses received are accurate, authentication is successful and session keys $K_S$ may be generated. Content may then be recorded/played-back 824 to/from the storage device 204. According to one example, the storage device 204 may verify that response $R_2$ it received from the accessing device 202, 206 is correct before generating and/or transmitting response $R_1$ to the accessing device (i.e., step 822 is performed before step 818 and/or step 816).

Figure 9:
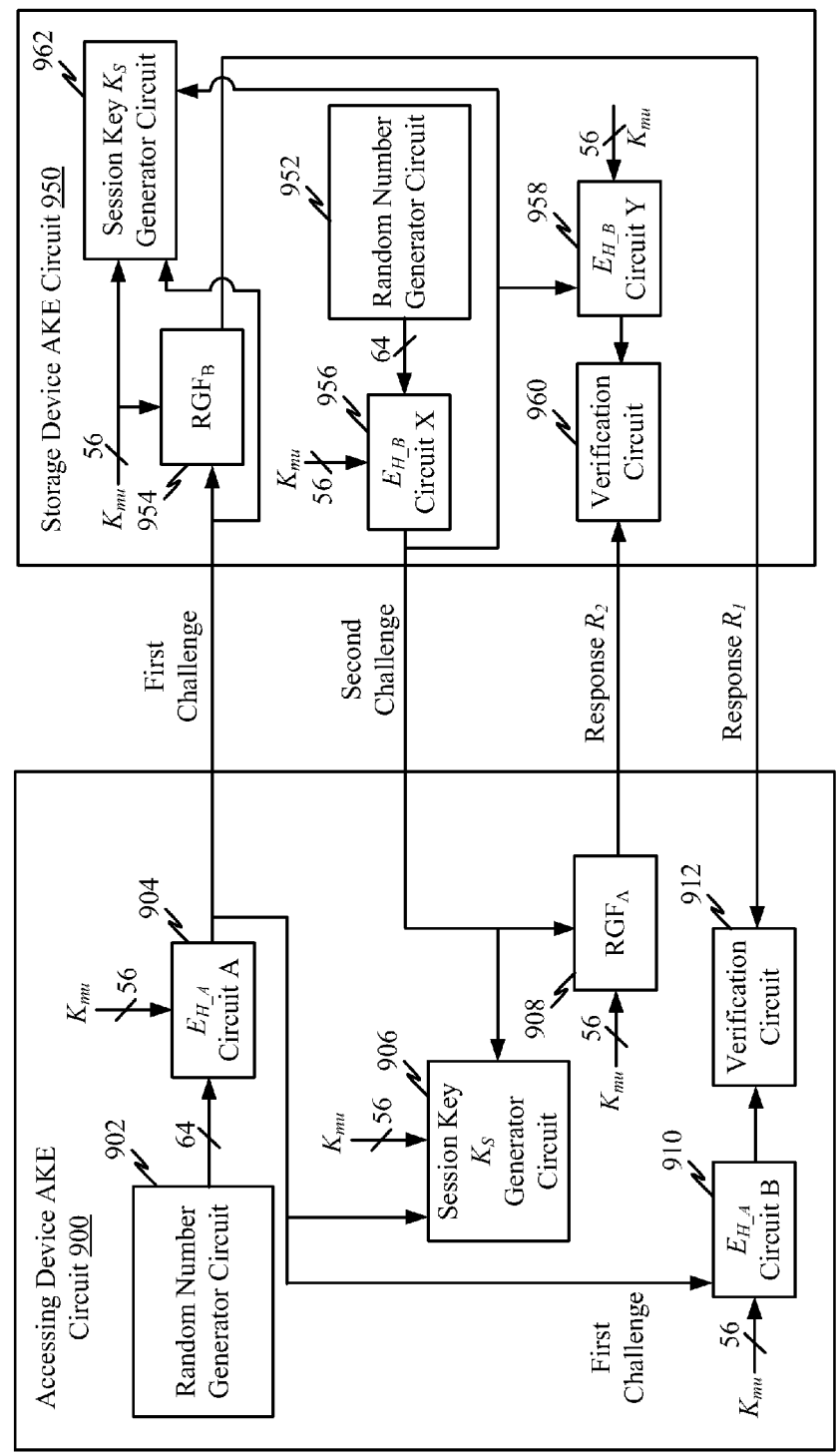
FIG. 9 illustrates a schematic block diagram of an accessing device's Enhanced AKE circuit in communication with a storage device's Enhanced AKE circuit.

FIG. 9 illustrates a schematic block diagram of an accessing device's Enhanced AKE circuit 900 in communication with a storage device's Enhanced AKE circuit 950 according to one aspect. The accessing device's AKE circuit 900 may include a random number generator 902, encryption $E_{H\_A}$ circuit A 904, response generation function circuit A ($RGF_A$) 908, encryption $E_{H\_A}$ circuit B 910, and a verification circuit 912. The storage device's AKE circuit 950 may include a random number generator 952, response generation function circuit B ($RGF_B$) 954, encryption $E_{H\_B}$ circuit X 956, encryption $E_{H\_B}$ circuit Y 958, and a verification circuit 960.

The random number generator 902 generates, for example, a 64-bit number that is fed into the encryption $E_{H\_A}$ circuit A 904. According to one example, the 64-bit random number may be comprised of a 32-bit secure command word and a 32-bit random number concatenated together. Receiving the random number and the symmetric key $K_{mu}$ as inputs, the encryption $E_{H\_A}$ circuit A 904 generates a first authentication challenge that is sent to the storage device's AKE circuit 950. The encryption $E_{H\_A}$ circuit A 904 may perform a cryptographic encryption function, such as but not limited to, AES, DES, or the Cryptomeria C2 algorithm.

The $RGF_A$ 908 receives a second authentication challenge from the storage device AKE circuit 950. Like the accessing device 202, 206, the storage device 204 may generate the second challenge by generating a random number using its random number generator circuit 952 and encryption $E_{H\_B}$ circuit X 956. As discussed in greater detail below, the $RGF_A$ 908 generates a response $R_2$ based on the second challenge, and then sends the response $R_2$ to the storage device AKE circuit 950.

Using the $RGF_B$ 954, the storage device AKE circuit 950 generates its own response $R_1$ based on the first challenge, and transmits response $R_1$ to the accessing device AKE circuit 900. The accessing device's verification circuit 912 receives the response $R_1$ and also a locally generated expected response value from the encryption $E_{H\_A}$ circuit B 910 based on the first challenge and $K_{mu}$. If the received response $R_1$ matches (i.e., is equal) to the locally generated expected response value then the accessing device AKE circuit 900 authenticates the storage device 204. Likewise, the storage device's verification circuit 960 receives the response $R_2$ from the accessing device AKE circuit 900 and also a locally generated expected response value from the encryption $E_{H\_B}$ circuit Y 958 based on the second challenge and $K_{mu}$. If the received response $R_2$ matches (i.e., is equal) to the locally generated expected response value then the storage device AKE circuit 950 authenticates the accessing device 202, 206.

The accessing device AKE circuit 900 may also include a session key $K_S$ generation circuit 906 that generates the session key $K_S$ based on the first and second challenges and also a key (e.g., $K_{mu}$). According to one example, the session key $K_S$ may be generated according to the formula (2) referenced above. According to other examples, the session key $K_S$ may be generated according to other functions based on the first and second challenges and a key (e.g., $K_{mu}$). The storage device AKE circuit 950 may similarly generate the session key $K_S$ using its own session key generation circuit 962.

Figure 10:
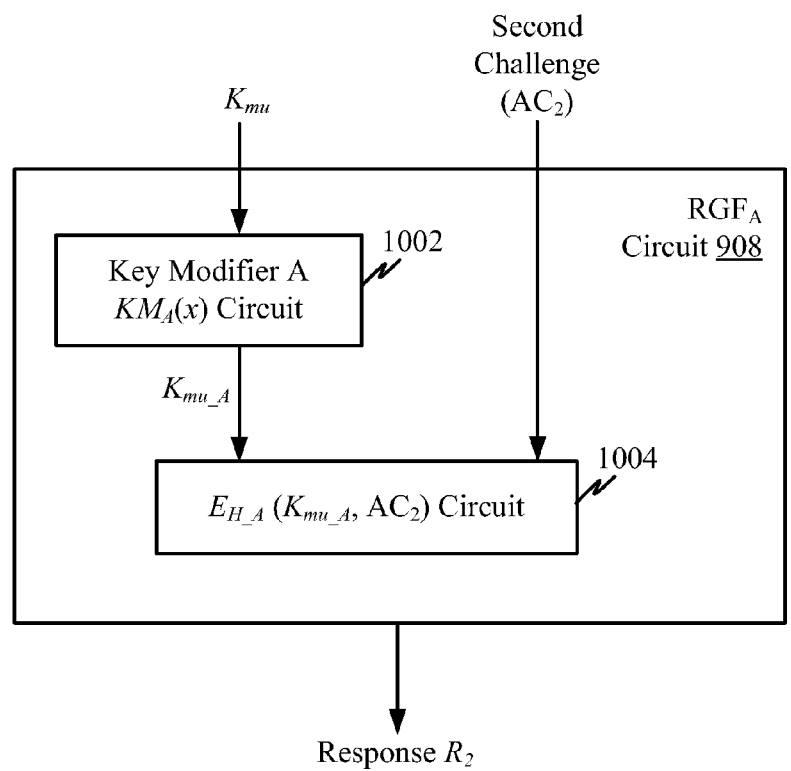
FIG. 10 illustrates a schematic block diagram of the $RGF_A$ circuit.

FIG. 10 illustrates a schematic block diagram of the $RGF_A$ circuit 908 according to one aspect of the disclosure. The $RGF_A$ may include a key modifier circuit 1002 and/or a cryptographic encryption $E_{H\_A}$ circuit 1004. The key modifier 1002 receives the symmetric key $K_{mu}$ as an input and performs a key modifier function $KM_A(x)$ on $K_{mu}$ to generate a modified key $K_{mu\_A}$ as an output (i.e., $K_{mu\_A}=KM_A(K_{mu})$). The $KM_A(x)$ function may perform any number and/or type of operations such that the resulting modified key $K_{mu\_A}$ has a different value than $K_{mu}$. For example, $KM_A(x)$ may perform any of the operations given by formulas (7), (8), (9):

$$KM_A(x)=x\,XOR\,m \qquad (7)$$

$$KM_A(x)=Rotate(x) \qquad (8)$$

$$KM_A(x)=x+m \qquad (9)$$

where m is any non-zero integer (e.g., fixed non-zero mask), and the Rotate(x) operation rotates all or a portion of the bits of the value x. The above operations (i.e., formulas, (7), (8), and (9)) are just examples. Any logical and/or arithmetic operation can be performed by $KM_A(x)$ so that the resulting output key $K_{mu\_A}$ is different than the input key $K_{mu}$. According to one aspect, the key modifier function $KM_A(x)$ may be a key derivation function (KDF) that generates the output key $K_{mu\_A}$ using a random or pseudo-random function.

The cryptographic encryption $E_{H\_A}$ circuit 1004 receives as its inputs the modified key $K_{mu\_A}$ and the second challenge ($AC_2$) and generates the response $R_2$ as an output. The $E_{H\_A}$ may be any cryptographic encryption operation, such as, but not limited to, DES, AES, or Cryptomeria C2. Thus, the cryptographic encryption $E_{H\_A}$ circuit 1004 encrypts the second challenge using the modified key $K_{mu\_A}$.

Figure 11:
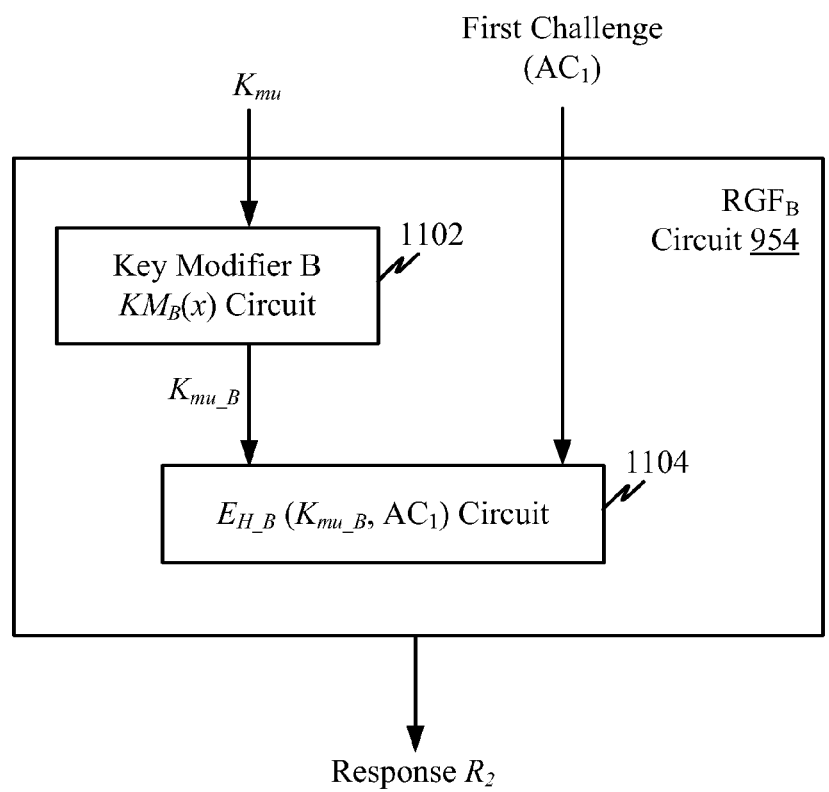
FIG. 11 illustrates a schematic block diagram of the $RGF_B$ circuit.

FIG. 11 illustrates a schematic block diagram of the $RGF_B$ circuit 954 according to one aspect of the disclosure. The $RGF_B$ may include a key modifier circuit 1102 and/or a cryptographic encryption $E_{H\_B}$ circuit 1104. The key modifier 1102 receives the symmetric key $K_{mu}$ as an input and performs a key modifier function $KM_A(x)$ on $K_{mu}$ to generate a modified key $K_{mu\_B}$ as an output (i.e., $K_{mu\_B}=KM_B(K_{mu})$). The $KM_A(x)$ function may perform any number and/or type of operations such that the resulting modified key $K_{mu\_B}$ has a different value than $K_{mu}$. For example, $KM_A(x)$ may perform any of the operations given by formulas (10), (11), (12):

$$KM_B(x)=x\,XOR\,m \qquad (10)$$

$$KM_B(x)=Rotate(x) \qquad (11)$$

$$KM_B(x)=x+m \qquad (12)$$

where m is any non-zero integer (e.g., fixed non-zero mask), and the Rotate(x) operation rotates all or a portion of the bits of the value x. The above operations (i.e., formulas, (10), (11), and (12)) are just examples. Any logical and/or arithmetic operation can be performed by $KM_B(x)$ so that the resulting output key $K_{mu\_B}$ is different than the input key $K_{mu}$. According to one aspect, the key modifier function $KM_B(x)$ may be a key derivation function (KDF) that generates the output key $K_{mu\_B}$ using a random or pseudo-random function.

The cryptographic encryption $E_{H\_B}$ circuit 1104 receives as its inputs the modified key $K_{mu\_B}$ and the first challenge ($AC_1$) and generates the response $R_1$ as an output. The $E_{H\_B}$ may be any cryptographic encryption operation, such as, but not limited to, DES, AES, or Cryptomeria C2. Thus, the cryptographic encryption $E_{H\_B}$ circuit 1104 encrypts the first challenge using the modified key $K_{mu\_B}$.

According to one aspect, the cryptographic encryption functions $E_{H\_A}$ and $E_{H\_B}$ are the same cryptographic function (i.e., $E_{H\_A}=E_{H\_B}$). For example, both may be a Cryptomeria C2 encryption algorithm. In such a case, the key modifier functions $KM_B(x)$ and $KM_B(x)$ are different from one another such that for a given input value x they produce different outputs. This helps ensure that even if the first and second challenges are the same (i.e. $AC_1=AC_2$) the output responses $R_1$ and $R_2$ of the RGFs 908, 954 will not be the same (i.e., $R_1 \neq R_2$). According to another aspect, both the cryptographic encryption functions $E_{H\_A}$ and $E_{H\_B}$ are different than one another and the key modifier functions $KM_B(x)$ and $KM_B(x)$ are different from one another.

According to another aspect, the cryptographic encryption functions $E_{H\_A}$ and $E_{H\_B}$ are different than one another but the key modifier functions $KM_B(x)$ and $KM_B(x)$ are the same (i.e., $KM_B(x)=KM_B(x)$). In such a case, the key modifier circuits 1002, 1102 may be absent altogether and the symmetric key $K_{mu}$ is directly received by the cryptographic encryption circuits 1004, 1104. Since the cryptographic encryption functions $E_{H\_A}$ and $E_{H\_B}$ are different from one another, even if the first and second challenges are the same (i.e. $AC_1=AC_2$) the output responses $R_1$ and $R_2$ of the RGFs 908, 954 will not be the same (i.e., $R_1 \neq R_2$).

Information related to what specific key modifier functions $KM_A(x)$ and $KM_B(x)$ and/or cryptographic encryption functions $E_{H\_A}$ and $E_{H\_B}$ are utilized by any one or more devices may be defined in advance according to the standards protocol.

Figure 12:
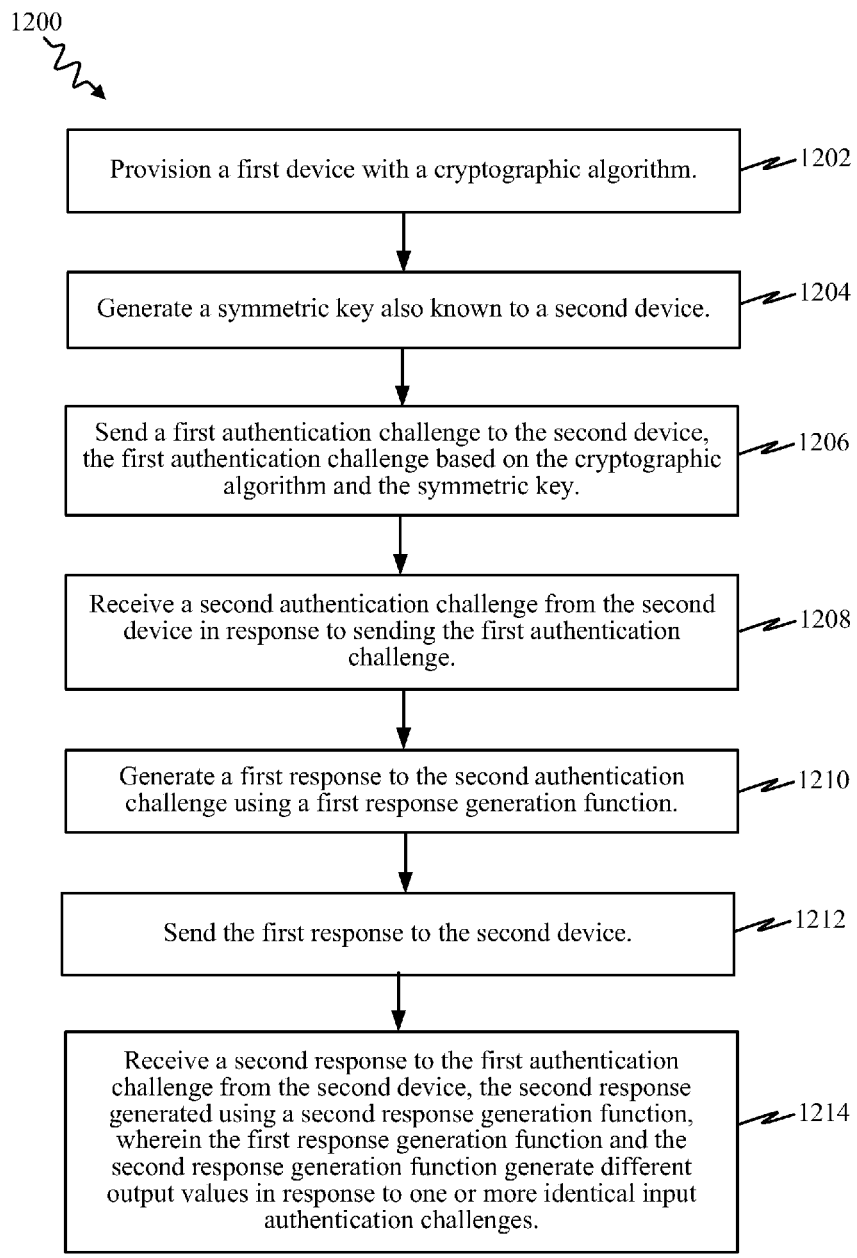
FIG. 12 illustrates a method operational at a first device for securing protected content.

FIG. 12 illustrates a method 1200 operational at a first device for securing protected content. First, the first device is provisioned with a cryptographic algorithm 1202. Next, a symmetric key is generated that is also known to a second device 1204. A first authentication challenge is then sent to the second device, where the first authentication challenge is based on the cryptographic algorithm and the symmetric key 1206. Next, a second authentication challenge is received from the second device in response to sending the first authentication challenge 1208. Then, a first response to the second authentication challenge is generated using a first response generation function 1210. Then, the first response is sent to the second device 1212. Finally, a second response to the first authentication challenge is received from the second device, the second response generated using a second response generation function, wherein the first response generation function and the second response generation function generate different output values in response to one or more identical input authentication challenges 1214.

In one example, if the first device is a recording device and the second device is a storage device, the recording device may provide encrypted content to the storage device for storage upon successful authentication of the second response $R_1$, where the encrypted content is secured with a key (e.g., title key $K_t$) that is encrypted as a function of a session key (e.g., $K_S$) generated from the first and second authentication challenges. The title key $K_t$ may also be further encrypted using the symmetric key (e.g., $K_{mu}$) as discussed with reference to FIG. 4.

In another example, if the first device is a playback device and the second device is a storage device, the playback device may retrieve encrypted content from the storage device upon successful authentication of the second response $R_1$, where the encrypted content is secured with a key (e.g., title key $K_t$) that is encrypted as a function of a session key (e.g., $K_S$) generated from the first and second authentication challenges.

Figure 13:
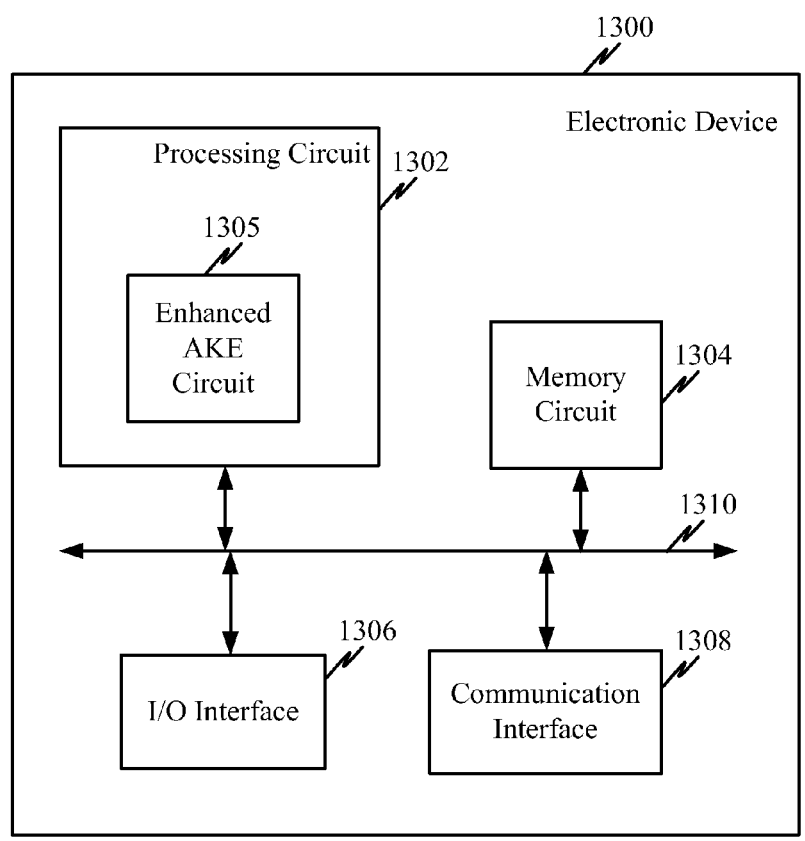
FIG. 13 illustrates a schematic block diagram of an electronic device.

FIG. 13 illustrates a schematic block diagram of an electronic device 1300 (e.g., accessing device 202, 206 and/or recording device) according to one aspect of the disclosure. The electronic device 1300 may include a processing circuit 1302, a memory circuit 1304, an input/output (I/O) interface 1306, and/or a communication interface 1308, which may be communicatively coupled through a bus 1310. The processing circuit 1302 includes at least one processor (e.g., application specific integrated circuit, digital signal processor, application processor, etc.) that is adapted to perform any of the operations described above with respect to FIGS. 4-12. The processing circuit 1302 includes the Enhanced AKE circuit 1305. The AKE circuit 1305 may be any of the aforementioned AKE circuits 600, 650, 900, 950 shown in FIG. 6 and FIG. 9.

The memory circuit 1304 includes one or more volatile, non-volatile memory circuits, and/or computer-readable media including, but not limited to, SRAM, DRAM, SDRAM, NAND FLASH, NOR FLASH, hard disk drives, compact discs (CDs), etc. The memory circuit 1304 is adapted to store, among other things, computer-readable instructions that when executed by one or more processors cause the processing circuit 1302 to perform at least one of the operations described above with respect to FIGS. 4-12. The memory circuit 1304 serves as one example of a means for provisioning a content accessing device and/or a first device with a cryptographic algorithm.

The I/O interface 1306 may include any one of a plurality of input and output devices including, but not limited to, a display, a keyboard, a touchscreen display, a mouse, a camera, a joystick, etc. The communication interface 1308 may include a wireless communication interface and/or a wired communication interface that allows the electronic device 1300 to communicate with one or more networks (e.g., cellular network) and/or other electronic devices. The communication interface 1308 serves as one example of a: means for sending a first authentication challenge to the content storage device (or a second device), the first authentication challenge based on the cryptographic algorithm and the symmetric key; means for receiving a second authentication challenge from the content storage device (or the second device) in response to sending the first authentication challenge; means for sending a first response to the content storage device (or the second device) in response to the second authentication challenge only if the second authentication challenge is different from the first authentication challenge; means for receiving a second response from the content storage device upon sending the first response; and means for receiving a second response to the first authentication challenge from the second device, the second response generated using a second response generation function, wherein the first response generation function and the second response generation function generate different output values in response to one or more identical input authentication challenges.

Figure 14:
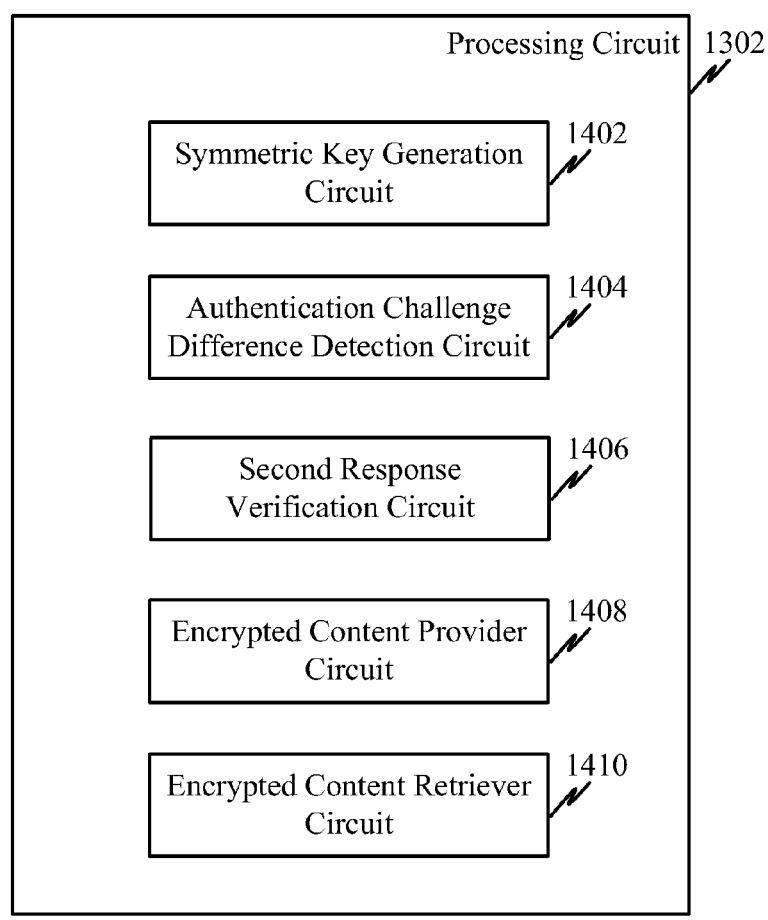
FIG. 14 illustrates a first example of a schematic block diagram of the processing circuit.

FIG. 14 illustrates a schematic block diagram of the processing circuit 1302 according to one aspect. The processing circuit 1302 may comprise a symmetric key generation circuit 1402, an authentication challenge difference detection circuit 1404, a second response verification circuit 1406, an encrypted content provider circuit 1408, and/or an encrypted content receiver circuit 1410. The symmetric key generation circuit 1402 serves as one example of a means for generating a symmetric key also known to a content storage device. The authentication challenge difference detection circuit 1404 serves as one example of a means for determining whether the first authentication challenge is different from the second authentication challenge. The second response verification circuit 1406 serves as one example of a means for verifying the second response using the first authentication challenge and the symmetric key. The encrypted content provider circuit 1408 serves as one example of a means for providing encrypted content to the storage device for storage, the encrypted content secured with a title key that is encrypted as a function of a session key generated from the first and second authentication challenges. The encrypted content receiver circuit 1410 serves as one example of a means for retrieving encrypted content from the storage device, the encrypted content secured with a title key that is encrypted as a function of a session key generated from the first and second authentication challenges.

Figure 15:
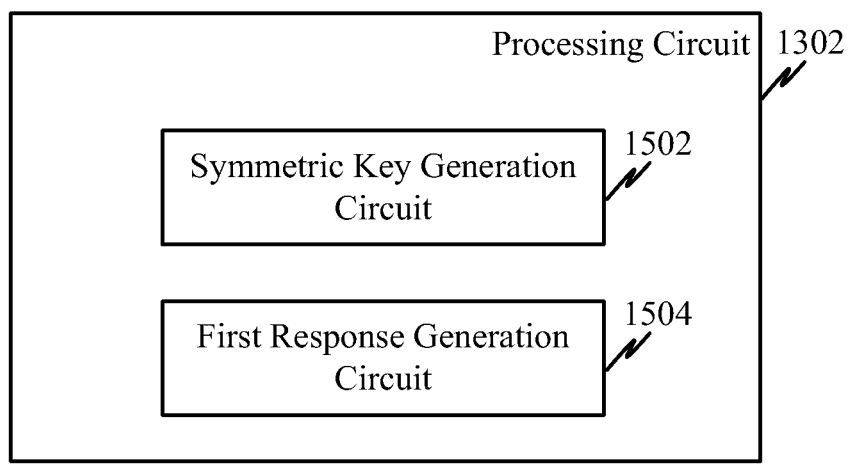
FIG. 15 illustrates a second example of a schematic block diagram of the processing circuit.

FIG. 15 illustrates a schematic block diagram of the processing circuit 1302 according to another aspect. The processing circuit 1302 may comprise a symmetric key generation circuit 1502 and/or a first response generation circuit 1504. The symmetric key generation circuit 1502 serves as one example of a means for provisioning a first device with a cryptographic algorithm. The first response generation circuit 1504 serves as one example of a means for generating a first response to the second authentication challenge using a first response generation function. The first response generation circuit 1504 also serves as one example of a means for generating the first response based on the first modified key, and a means for generating the first response using a first cryptographic encryption function.

One or more of the components, steps, features, and/or functions illustrated in FIGS. 2, 3, 4, 5, 6, 7A, 7B, 8, 9, 10, 11, 12, 13, 14, and/or 15 may be rearranged and/or combined into a single component, step, feature or function or embodied in several components, steps, or functions. Additional elements, components, steps, and/or functions may also be added without departing from the invention. The apparatus, devices, and/or components illustrated in FIGS. 2, 3, 4, 6, 9, 10, 11, 13, 14, and/or 15 may be configured to perform one or more of the methods, features, or steps described in FIGS. 5, 7A, 7B, 8, and/or 12. The algorithms described herein may also be efficiently implemented in software and/or embedded in hardware.

Moreover, in one aspect of the disclosure, the processing circuit 1302 illustrated in FIG. 13 may be a specialized processor (e.g., an application specific integrated circuit (e.g., ASIC)) that is specifically designed and/or hard-wired to perform the algorithms, methods, and/or steps described in FIGS. 5, 7A, 7B, 8, and/or 12. Thus, such a specialized processor (e.g., ASIC) may be one example of a means for executing the algorithms, methods, and/or steps described in FIGS. 5, 7A, 7B, 8, and/or 12.

Also, it is noted that the aspects of the present disclosure may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices and/or other machine-readable mediums and, processor-readable mediums, and/or computer-readable mediums for storing information. The terms "machine-readable medium", "computer-readable medium", and/or "processor-readable medium" may include, but are not limited to non-transitory mediums such as portable or fixed storage devices, optical storage devices, and various other mediums capable of storing, containing or carrying instruction(s) and/or data. Thus, the various methods described herein may be fully or partially implemented by instructions and/or data that may be stored in a "machine-readable medium", "computer-readable medium", and/or "processor-readable medium" and executed by one or more processors, machines and/or devices.

Furthermore, aspects of the disclosure may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different systems without departing from the invention. It should be noted that the foregoing aspects of the disclosure are merely examples and are not to be construed as limiting the invention. The description of the aspects of the present disclosure is intended to be illustrative, and not to limit the scope of the claims. As such, the present teachings can be readily applied to other types of apparatuses and many alternatives, modifications, and variations will be apparent to those skilled in the art.

What is claimed is:

1. A method operational on a content accessing device for securing content, the method comprising:
provisioning the content accessing device with a cryptographic algorithm;
generating a symmetric key also known to a content storage device;
sending a first authentication challenge to the content storage device, the first authentication challenge based on the cryptographic algorithm and the symmetric key;
receiving a second authentication challenge from the content storage device in response to sending the first authentication challenge;
determining whether the first authentication challenge is different from the second authentication challenge; and
sending a first response to the content storage device in response to the second authentication challenge only if the second authentication challenge is different from the first authentication challenge.

2. The method of claim 1, further comprising:
receiving a second response from the content storage device upon sending the first response; and
verifying the second response using the first authentication challenge and the symmetric key.

3. The method of claim 2, wherein upon successful authentication of the second response the method further comprises:
providing encrypted content to the storage device for storage, the encrypted content secured with a title key that is encrypted as a function of a session key generated from the first and second authentication challenges.

4. The method of claim 2, wherein upon successful authentication of the second response the method further comprises:
retrieving encrypted content from the storage device, the encrypted content secured with a title key that is encrypted as a function of a session key generated from the first and second authentication challenges.

5. The method of claim 1, wherein the symmetric key is derived from a media identifier received from the storage device and a media key, the media key derived in part by at least one of a plurality of media key blocks (MKB) received from the storage device.

6. The method of claim 1, wherein the second authentication challenge is also based on the cryptographic algorithm and the symmetric key.

7. A content accessing device, comprising:
a communication interface configured to communicate with a content storage device;
a memory circuit communicatively coupled to the communication interface, the memory circuit configured to store a cryptographic algorithm; and
a processing circuit communicatively coupled to the communication interface and the memory circuit, the processing circuit configured to
generate a symmetric key also known to the content storage device,
send a first authentication challenge to the content storage device, the first authentication challenge based on the cryptographic algorithm and the symmetric key,
receive a second authentication challenge from the content storage device in response to sending the first authentication challenge,
determine whether the first authentication challenge is different from the second authentication challenge, and
send a first response to the content storage device in response to the second authentication challenge only if the second authentication challenge is different from the first authentication challenge.

8. The content accessing device of claim 7, wherein the processing circuit is further configured to:
receive a second response from the content storage device upon sending the first response; and
verify the second response using the first authentication challenge and the symmetric key.

9. The content accessing device of claim 8, wherein upon successful authentication of the second response the processing circuit is further configured to:
provide encrypted content to the storage device for storage, the encrypted content secured with a title key that is encrypted as a function of a session key generated from the first and second authentication challenges.

10. The content accessing device of claim 8, wherein upon successful authentication of the second response the processing circuit is further configured to:
retrieve encrypted content from the storage device, the encrypted content secured with a title key that is encrypted as a function of a session key generated from the first and second authentication challenges.

11. The content accessing device of claim 7, wherein the symmetric key is derived from a media identifier received from the storage device and a media key, the media key derived in part by at least one of a plurality of media key blocks (MKB) received from the storage device.

12. The content accessing device of claim 7, wherein the second authentication challenge is also based on the cryptographic algorithm and the symmetric key.

13. A content accessing device, comprising:
means for provisioning the content accessing device with a cryptographic algorithm;
means for generating a symmetric key also known to a content storage device;
means for sending a first authentication challenge to the content storage device, the first authentication challenge based on the cryptographic algorithm and the symmetric key;
means for receiving a second authentication challenge from the content storage device in response to sending the first authentication challenge;
means for determining whether the first authentication challenge is different from the second authentication challenge; and
means for sending a first response to the content storage device in response to the second authentication challenge only if the second authentication challenge is different from the first authentication challenge.

14. The content accessing device of claim 13, further comprising:
means for receiving a second response from the content storage device upon sending the first response; and
means for verifying the second response using the first authentication challenge and the symmetric key.

15. The content accessing device of claim 14, wherein upon successful authentication of the second response the content accessing device further comprises:
means for providing encrypted content to the storage device for storage, the encrypted content secured with a title key that is encrypted as a function of a session key generated from the first and second authentication challenges.

16. The content accessing device of claim 14, wherein upon successful authentication of the second response the content accessing device further comprises:
means for retrieving encrypted content from the storage device, the encrypted content secured with a title key that is encrypted as a function of a session key generated from the first and second authentication challenges.

17. A non-transitory computer-readable storage medium having instructions stored thereon for securing content by a content storage device, the instructions which when executed by at least one processor causes the processor to: provision the content accessing device with a cryptographic algorithm; generate a symmetric key also known to a content storage device; send a first authentication challenge to the content storage device, the first authentication challenge based on the cryptographic algorithm and the symmetric key; receive a second authentication challenge from the content storage device in response to sending the first authentication challenge; determine whether the first authentication challenge is different from the second authentication challenge; and send a first response to the content storage device in response to the second authentication challenge only if the second authentication challenge is different from the first authentication challenge.

18. The non-transitory computer-readable storage medium of claim 17, where the instructions when executed by the processor further cause the processor to: receive a second response from the content storage device upon sending the first response; and verify the second response using the first authentication challenge and the symmetric key.

19. The non-transitory computer-readable storage medium of claim 18, wherein upon successful authentication of the second response the instructions which when executed by the processor further cause the processor to; provide encrypted content to the storage device for storage, the encrypted content secured with a title key that is encrypted as a function of a session key generated from the first and second authentication challenges.

20. The non-transitory computer-readable storage medium of claim 18, wherein upon successful authentication of the second response the instructions which when executed by the processor further cause the processor to: retrieve encrypted content from the storage device, the encrypted content secured with a title key that is encrypted as a function of a session key generated from the first and second authentication challenges.

21. A method operational on a first device for securing protected content, the method comprising:
provisioning the first device with a cryptographic algorithm;
generating a symmetric key also known to a second device;
sending a first authentication challenge to the second device, the first authentication challenge based on the cryptographic algorithm and the symmetric key;
receiving a second authentication challenge from the second device in response to sending the first authentication challenge;
generating a first response to the second authentication challenge using a first response generation function;
sending the first response to the second device; and
receiving a second response to the first authentication challenge from the second device, the second response generated using a second response generation function, wherein the first response generation function and the second response generation function generate different output values in response to one or more identical input authentication challenges.

22. The method of claim 21, wherein the second authentication challenge is also based on the cryptographic algorithm and the symmetric key.

23. The method of claim 21, wherein the first response generation function includes a first key modifier function that generates a first modified key as a function of the symmetric key, the first modified key different than the symmetric key, and the method further comprises:
generating the first response based on the first modified key.

24. The method of claim 23, wherein the second response received is generated based on the symmetric key.

25. The method of claim 23, wherein the second response received is generated based on a second modified key, the second modified key being a function of the symmetric key and different than the first modified key.

26. The method of claim 23, wherein the first key modifier function generates the first modified key based on the symmetric key by at least one of: (a) bit rotating at least a portion of the symmetric key; (b) XORing at least a portion of the symmetric key with a fixed non-zero mask; and/or (c) adding or subtracting an arithmetic constant to the symmetric key.

27. The method of claim 23, wherein the first key modifier function is a key derivation function that uses a random or pseudorandom function to generate the first modified key.

28. The method of claim 21, wherein the first response generation function includes a first cryptographic encryption function and the second response generation function includes a second cryptographic encryption function, the first cryptographic encryption function different than the second cryptographic encryption function, and the method further comprises:
generating the first response using the first cryptographic encryption function, and the second response is generated using the second cryptographic encryption function.

29. A first device for securing protected content, the first device comprising:
a communication interface configured to communicate with a second device;
a memory circuit communicatively coupled to the communication interface, the memory circuit configured to store a cryptographic algorithm; and
a processing circuit communicatively coupled to the memory circuit and the communication interface, the processing circuit configured to
generate a symmetric key also known to the second device,
send a first authentication challenge to the second device, the first authentication challenge based on the cryptographic algorithm and the symmetric key,
receive a second authentication challenge from the second device in response to sending the first authentication challenge,
generate a first response to the second authentication challenge using a first response generation function,
send the first response to the second device, and
receive a second response to the first authentication challenge from the second device, the second response generated using a second response generation function, wherein the first response generation function and the second response generation function generate different output values in response to one or more identical input authentication challenges.

30. The first device of claim 29, wherein the second authentication challenge is also based on the cryptographic algorithm and the symmetric key.

31. The first device of claim 29, wherein the first response generation function includes a first key modifier function that generates a first modified key as a function of the symmetric key, the first modified key different than the symmetric key, and the processing circuit is further configured to:
generate the first response based on the first modified key.

32. The first device of claim 31, wherein the second response received is generated based on the symmetric key.

33. The first device of claim 31, wherein the second response received is generated based on a second modified key, the second modified key a function of the symmetric key, the second modified key different than the first modified key.

34. The first device of claim 31, wherein the first key modifier function generates the first modified key based on the symmetric key by at least one of: (a) bit rotating at least a portion of the symmetric key; (b) XORing at least a portion of the symmetric key with a fixed non-zero mask; and/or (c) adding or subtracting an arithmetic constant to the symmetric key.

35. The first device of claim 31, wherein the first key modifier function is a key derivation function that uses a random or pseudorandom function to generate the first modified key.

36. The first device of claim 29, wherein the first response generation function includes a first cryptographic encryption function and the second response generation function includes a second cryptographic encryption function, the first cryptographic encryption function different than the second cryptographic encryption function, and the processing circuit is further configured to:

generate the first response using the first cryptographic encryption function, and the second response is generated using the second cryptographic encryption function.

37. A first device for securing protected content, the first device comprising:
- means for provisioning the first device with a cryptographic algorithm;
- means for generating a symmetric key also known to a second device;
- means for sending a first authentication challenge to the second device, the first authentication challenge based on the cryptographic algorithm and the symmetric key;
- means for receiving a second authentication challenge from the second device in response to sending the first authentication challenge;
- means for generating a first response to the second authentication challenge using a first response generation function;
- means for sending the first response to the second device; and
- means for receiving a second response to the first authentication challenge from the second device, the second response generated using a second response generation function, wherein the first response generation function and the second response generation function generate different output values in response to one or more identical input authentication challenges.

38. The method of claim 37, wherein the first response generation function includes a first key modifier function that generates a first modified key as a function of the symmetric key, the first modified key different than the symmetric key, and the first device further comprises:
- means for generating the first response based on the first modified key.

39. A non-transitory computer-readable storage medium having instructions stored thereon for securing protected content on a first device, the instructions which when executed by at least one processor cause the processor to: provision the first device with a cryptographic algorithm; generate a symmetric key also known to a second device; send a first authentication challenge to the second device, the first authentication challenge based on the cryptographic algorithm and the symmetric key; receive a second authentication challenge from the second device in response to sending the first authentication challenge; generate a first response to the second authentication challenge using a first response generation function; send the first response to the second device; and receive a second response to the first authentication challenge from the second device, the second response generated using a second response generation function, wherein the first response generation function and the second response generation function generate different output values in response to one or more identical input authentication challenges.

40. The non-transitory computer-readable storage medium of claim 39, wherein the first response generation function includes a first key modifier function that generates a first modified key as a function of the symmetric key, the first modified key different than the symmetric key, and the instructions when executed by the processor further cause the processor to: generate the first response based on the first modified key.

* * * * *